United States Patent [19]

Hegelman

[11] 3,951,277

[45] Apr. 20, 1976

[54] STACKER STORAGE SYSTEM

[75] Inventor: Theodore N. Hegelman, Birmingham, Mich.

[73] Assignee: Standard Alliance Industries, Chicago, Ill.

[22] Filed: Jan. 5, 1976

[21] Appl. No.: 332,502

Related U.S. Application Data

[63] Continuation-in-part of Ser. No. 714,495, March 20, 1968, abandoned.

[52] U.S. Cl. ........................ 214/16.4 A; 214/16.4 C

[51] Int. Cl.[2] ........................................ B65G 01/06

[58] Field of Search .......... 214/16.4 A, 730, 16.4 C, 214/16.1 C, 16.1 CC

[56] References Cited

UNITED STATES PATENTS

| | | | |
|---|---|---|---|
| 2,799,231 | 7/1957 | Temple | 214/16.4 C |
| 2,941,738 | 6/1960 | Burke et al. | 214/16.4 A |

FOREIGN PATENTS OR APPLICATIONS

| | | | |
|---|---|---|---|
| 1,579,470 | 7/1969 | France | 214/16.4 A |
| 1,138,094 | 1/1957 | France | 16.1 CE/ |
| 1,536,359 | 7/1968 | France | 214/16.1 CE |

*Primary Examiner*—Robert J. Spar
*Assistant Examiner*—R. B. Johnson
*Attorney, Agent, or Firm*—Harness, Dickey & Pierce

[57] ABSTRACT

A plant work transport and storage system having horizontally spaced delivery and pick-up conveyor tracks on which work carriers travel in the system, a work storage area disposed adjacent the conveyor tracks, a first spur track section extending from the delivery track to a first work transfer point adjacent to the work storage area and adapted to transport work carriers from the delivery track to the work storage area, a second spur track section extending from a second work transfer point adjacent to the work storage area and connecting with the pick-up track and adapted to transport work carriers from the work storage area to the pick-up track, the work storage area having at least one bank of vertically and horizontally spaced work storage compartments provided with an overhead storage track section, a stacker crane assembly movable horizontally alongside the bank of work storage compartments between individual work storage compartments and to and from said first and second work transfer points and provided with a transfer track section, the stacker crane assembly including elevating means for moving the transfer track section vertically of the work storage compartments and between individual compartments, means mounted on the elevating means and movable thereon for selectively positioning the transfer track section in aligned, substantially butting end-to-end relation with a selected spur track section and selectively individually with the storage track sections when the elevating means is at selected vertical and horizontal positions relative to the storage area, and means for moving work carriers onto and off of the transfer track section at the transfer points and at the storage compartments.

54 Claims, 16 Drawing Figures

STACKER STORAGE SYSTEM

RELATED APPLICATIONS

This is a continuation-in-part application of Ser. No. 714,495, filed Mar. 20, 1968 now abandoned.

BACKGROUND OF THE INVENTION

The continuously increasing use of more sophisticated mass production techniques in the assembly of large and relatively complicated machines, vehicles and similar devices comprising a substantially large number of component parts has prompted the development of various types of storage and conveying systems adapted to receive and temporarily store large numbers of component parts or workpieces preparatory to these parts being supplied to associated work stations or production lines where such parts are subjected to various manufacturing operations and are eventually assembled. Heretofore, such storage and conveying systems have consisted of a storage area and a conveying apparatus for picking up the component parts from some location and transferring such parts to a preselected destination in the storage area.

As such component storage systems have become more necessary in mass production applications, the component or material handling equipment incorporated in the storage systems have become continuously more complex, due primarily to the minimum tolerance requirements permitted in the operation of the component conveyor systems in relationship to the associated storage racks or the like in the storage areas, as well as the various problems encountered at the marshalling areas where the component parts were transferred, for example from railroad cars or the like, to the conveyor systems. Also, considerable difficulty has arisen as a result of the need for identifying and coding the various components or workpieces to be stored and the task of conveying the identified products to the conveyor pickup points while maintaining the validity of the loads and relative orientation thereof with relation to the conveyor apparatus.

In order to cope with the above difficulties, it has been necessary to provide and utilize slave pallets onto which the component parts which were to be stored are placed in order to maintain consistent load dimensions with respect to the conveying apparatus, with the result that the conveying apparatus of necessity has consisted of relatively complex equipment for receiving, transporting, delivering and storing such slave pallets and their respective loads. Most recently, such equipment has frequently been in the form of accumulating type indexing conveyors, including automatic turn-tables for effecting 90° or other suitable transfer of the component parts, automatic elevators, and empty pallet return conveyors. Also, such systems have required empty pallet stacking devices, as well as devices for unstacking the empty pallets and delivering them to the marshalling areas preparatory to their receiving new loads to be transferred to the storage complex.

One particular serious problem resulting from the use of the aforementioned type slave pallets with workpiece storage systems has been the necessity of providing means for automatically aligning or "squaring up" the loads with their respective pallets preparatory to the loads being conveyed to the storage area, and means in the form of rejecting stations for automatically rejecting a particular slave pallet and associated load where some predetermined alignment or relative orientation thereof was not achieved. Among other problems resulting from such storage and conveyor systems has been the difficulty in determining what to do with the loads to be stored as they are removed from railroad cars or truck trailers prior to being identified, coded and conveyed to the storage system. Also, many problems have arisen in determining how to transport the stored loads from the storage area to the point of need in the associated production line or the like.

In accordance with the principles of the present invention, a new and improved stacker type storage system is provided which is intended to obviate the aforementioned difficulties encountered in heretofore known systems which employed slave pallets and similar type workpiece transferring apparatus. Generally speaking, the stacker storage system of the present invention is adapted to be operatively associated with a "power and free" or similar type conveying system well known in the art and comprising a plurality of trolley-like component carrier members movable along an overhead track and from which workpieces or components are suspended. Conventionally, a power driven chain or the like is located adjacent the overhead track and is provided with means selectively engageable and disengageable from the carrier members in a predetermined manner to effect the desired movement of the members and component parts suspended therefrom along preselected paths defined by the overhead track.

Generally speaking, the storage system of the present invention comprises a storage complex including a plurality of rows or tiers of storage cubicles and a workpiece transfer assembly adapted to receive workpiece carrier members and the workpiece supported thereby from the associated conveyor system, and convey these carrier members and workpieces to preselected storage cubicles in accordance with some predetermined code or identification, whereby the workpieces may be stored for some predetermined amount of time before being supplied to an associated assembly or production line. At such time as it is desired to utilize the workpieces stored in the cubicles, the present invention functions to retrieve the carrier members and workpieces supported thereby and deliver the same to the associated conveyor system which may then function to selectively deliver the workpieces to their respective work or assembly stations.

By virtue of the principles of the present invention, a considerably more simplified flow of stored materials is provided between the storage complex and their respective points of need or work stations. More importantly, however, the present invention entirely eliminates the need for any conveyor slave pallets as has been required in similar type storage systems heretofore known and used. Accordingly, the many problems attendant the storage and transfer of such slave pallets after they have successfully delivered a workpiece to a work station, and prior to their being provided with successive workpieces, are entirely obviated. Furthermore, through the principles of the present invention, greater operating tolerances are provided within the storage complex and all equipment heretofore required for assuring positive alignment of the loads and their associated slave pallets is eliminated. Also, by virtue of the fact that the present invention readily lends itself to being entirely automated, for example, as by a suitable computerized control system, operation of the storage system of the present invention will find universality of application.

RELATED PRIOR ART

The subject matter disclosed and claimed herein is related generally to the following patents:

| United States | Canadian |
|---|---|
| 2,941,738 | 501,332 |
| 3,029,959 | 733,782 |
| 3,268,097 | French |
| British | 1,138,094 |
| 1,032,550 | 1,515,727 |
| 1,035,237 | German |
| 1,050,544 | 1,032,550 |
| 1,052,837 | 1,515,727 |
| 1,070,176 | 1,976,985 |
| 1,091,858 | |

SUMMARY OF THE INVENTION

This invention relates generally to workstock handling and storage equipment and, more particularly, to a new and improved stacker storage system for use in selectively storing component parts preparatory to delivery thereof to an associated production or assembly line.

It is a general object of the present invention to provide a new and improved stacker storage system which is adapted to overcome the various shortcomings and problems encountered with similar type storage systems heretofore known and used.

It is a more particular object of the present invention to provide a new and improved stacker storage system which will find particularly useful application in operative association with overhead conveyor systems of the power and free type.

It is another object of the present invention to provide a new and improved stacker storage system of the above character which is extremely efficient in operation, thereby minimizing the time and procedural steps required to deliver successive workpieces to a storage complex and to retrieve such workpieces preparatory to transferring them to some preselected operational destination.

It is still another object of the present invention to provide a new and improved stacker storage system of the above character which may be manually operated or may be adapted for entirely automatic operation.

It is a further object of the present invention to provide a stacker storage system of the above described type which entirely eliminates the need for any workpiece conveying slave pallets or the like, thereby obviating the need for any apparatus used for storing, transporting or otherwise handling of such pallets.

It is still another object of the present invention to provide a new and improved stacker storage system that will find universality of application to various types of operational environments.

It is another object of the present invention to provide a new and improved stacker storage system which is of extremely efficient design, is of a rugged construction and which will have a long and effective operational life.

Other objects and advantages of the present invention will become apparent from the following detailed description, taken in conjunction with the accompanying drawings.

DETAILED DESCRIPTION OF THE PREFERRED EMBODIMENT

Figure 1:
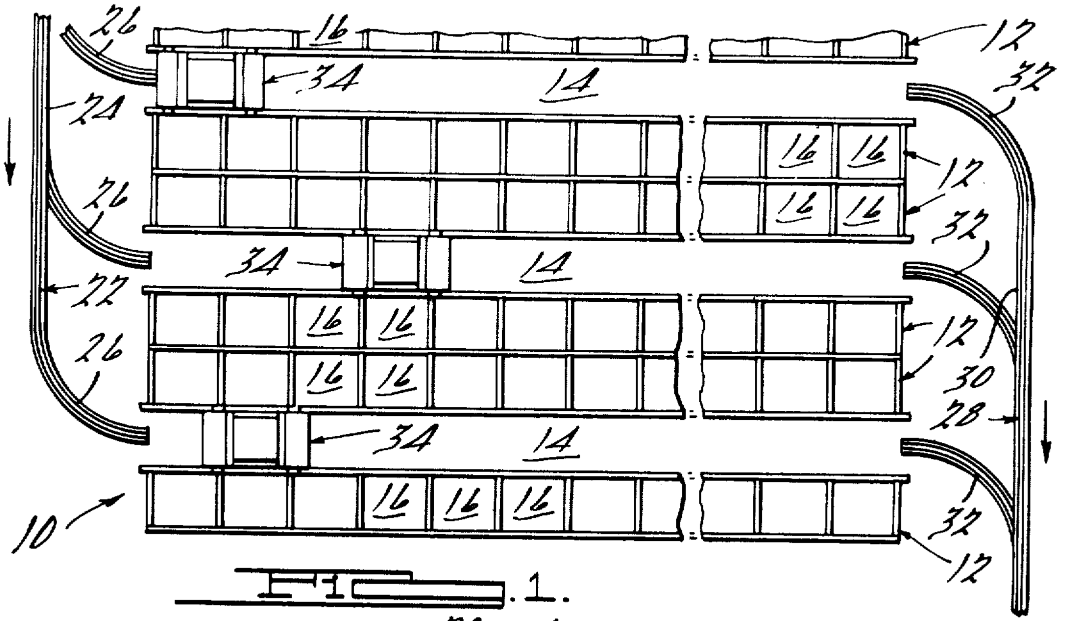
FIG. 1 is a schematic illustration of an exemplary embodiment of the workpiece storage complex of the present invention.
Figure 2:
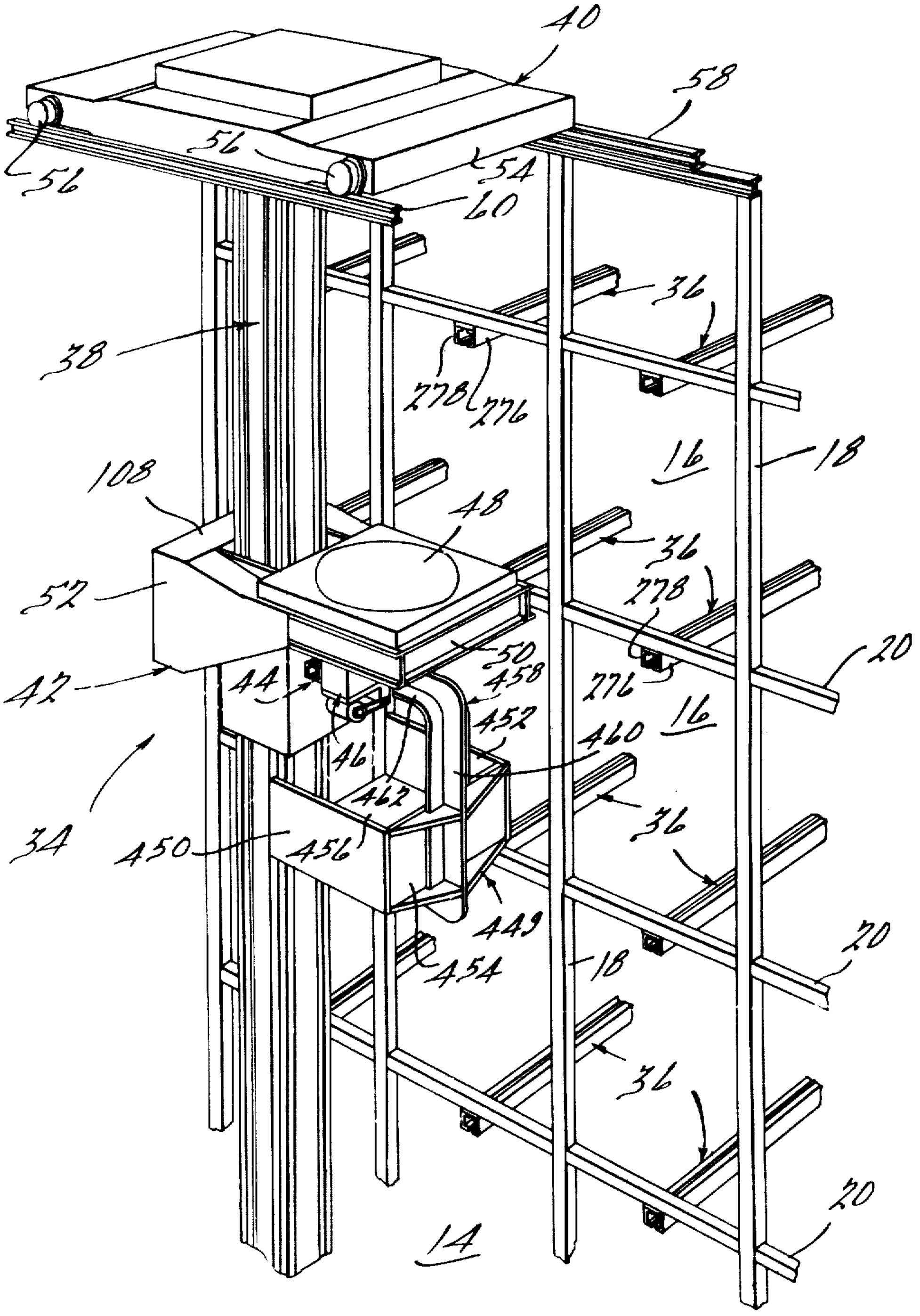
FIG. 2 is an elevated perspective view of one of the stacker crane assemblies incorporated in the stacker storage system of the present invention, as shown in operative association with a fragmentary representation of a plurality of workpiece storage cubicles.

Referring now to FIG. 1 of the drawings, the stacker storage system of the present invention is shown in operative association with a typical workpiece storage complex, generally designated 10, comprising a plurality of spaced parallel rows of workpiece storage cubicles 12 that are arranged in banks so as to provide workpiece transfer aisles 14 between each pair of confronting cubicle rows 12. Each of the rows 12 comprises a plurality of adjacent tiers of vertically and horizontally spaced workpiece storage cubicles, generally designated 16, which, as best illustrated in FIG. 2, are defined by a plurality of longitudinally spaced, vertically extending parallel frame members 18 and a plurality of vertically spaced, horizontally disposed frame members 20. As will later be described, each of the cubicles 16 is adapted to receive one or more workpieces or components for purposes of storing the same preparatory to such workpieces being transferred to an associated assembly or production station.

The various workpieces which are to be stored in the cubicles 16 are adapted to be transferred to the storage complex 10 from an associated workpiece marshalling area (not shown), and from the storage complex 10 to an associated assembly line or station (also not shown), by means of a suitable conveyor system which is preferably of the type comprising an overhead workpiece transfer track, as is well known in the art. By way of example, the workpieces may be conveyed to the storage complex 10 by means of an overhead inbound conveyor track 22 consisting of a main conveyor track section 24 and a plurality of spur track sections 26 which lead from the main conveyor section 24 and define workpiece carrier or trolley transfer points having discharge ends adjacent each of the aisles 14 between the cubicle rows 12. Similarly, the storage complex 10 may be provided with an overhead outbound conveyor track 28 having a main section 30 and a plurality of spur track sections 32 defining carrier or trolley transer points having pick-up ends adapted to convey workpieces from the storage complex 10 to the associated assembly station.

The conveyor system associated with the storage complex 10 is preferably of the "power-and-free" type comprising a plurality of trolley-like workpiece carrier members movable along the conveyor tracks 22–32 and from which workpieces are suspended. Such conveyor systems are conventionally provided with some type of power driven chain or the like having means thereon engageable with and disengageable from the workpiece carrier members in a predetermined manner so as to effect the desired workpiece delivery along the paths defined by the conveyor tracks. By way of example, one typical power and free conveyor system which will be found to be readily compatible with the present invention is shown in copending application, Ser. No. 519,797, for Power and Free Conveyor System, filed Jan. 10, 1966, now U.S. Pat. No. 3,415,201, issued Dec. 10, 1968, and assigned to the assignee of the present application. It will be appreciated, of course, that various other types of overhead conveyor systems may be operatively associated with the present invention and that reference to the system disclosed in said copending application is made merely to show an exemplary type conveyor system.

Generally speaking, the stacker storage system of the present invention is designed to transfer various workpieces from the inbound conveyor track 22 to the various cubicles 16 where the workpieces are adapted to be stored until such time as they are required at some predetermined work station, at which time the system of the present invention functions to retrieve the workpieces from their respective cubicles 16 and deliver the same to the outboard conveyor track 28 which functions to transfer the workpieces to the work station. More particularly, the stacker storage system of the present invention is adapted to transfer the individual workpieces, together with the trolley or carrier members from which the workpieces are suspended, directly off from the feeder track sections 26 and onto a transit track, which preferably consists of a section of track that is of substantially the same configuration as the feeder track sections 26, and which is adapted to support the carrier members and their associated workpiece as they are moved toward the cubicles 16 within which the workpieces are to be stored. Each of the cubicles 16 is provided with a support track, best illustrated in FIG. 2 and designated by the numeral 36, which may be of substantially the same construction as the tracks of the associated conveyor system and the transit track, and that functions to receive and support one or more carrier members and the workpieces suspended therefrom within the cubicles 16. After the workpieces and associated carrier members have been moved to positions in registry or in front of the respective cubicles 16 in which the workpieces are to be stored, the carrier members and workpieces suspended therefrom are transferred from the transit track to the support tracks 36, whereby the workpieces are supported within the cubicles 16.

When it is desired to transfer the workpieces from their respective cubicles 16, the carrier members and workpieces supported thereby are transferred from the support tracks in the cubicles 16 to the transit track, after which time the transit track, carrier members and workpieces are moved longitudinally of the cubicle rows 12 to a position wherein the carrier members may be transferred from the transit track onto the feeder track sections 32 which communicate with the outbound conveyor track 28, whereby the carrier members and workpieces may be conveyed in a conventional manner by the power driven chain or the like associated with the conveyor track 28 to some predetermined operative destination.

In accordance with the present invention, the aforedescribed transfer of workpieces and their associated carrier members between the conveyor tracks 22, 28 and the various cubicles 16 is achieved by means of a plurality of stacker crane assemblies, generally designated 34, that are disposed one in each of the aisles 14. Each of the assemblies 34 is provided with one of the aforementioned transit tracks and is adapted to move longitudinally of the aisles 14 to pick up, deliver and retrieve the various workpieces and associated carrier members from the feeder conveyor track sections 26, 32 and cubicles 16, as will hereinafter be described in detail. By virtue of the fact that each of the various stacker crane assemblies 34 located in the aisles 14 of the storage complex 10 may be and preferably is identical in construction and operation, the following detailed description of one of the assemblies 34 shown in FIG. 1 will be readily applicable to each of the other of said assemblies 34.

Referring now in detail to FIG. 2, the stacker crane assembly 34 is shown as comprising a substantially vertically disposed support column 38 which is fixed at its upper end to and depends downwardly from a crane carriage assembly, generally designated 40, that supports the column 38 for longitudinal movement along the associated transfer aisle 14. The support column 38 is adapted to support a vertically movable hoist assembly, generally designated 42, thereon, which assembly 42 is designed to move upwardly and downwardly along the support column 38 so as to move into registry with preselected cubicles 16 in the adjacent cubicle tiers. As will hereinafter be described in detail, the hoist assembly 42 is provided with a transit track 44 and a plurality of operating mechanisms, namely a carrier transfer mechanism 46, a rotary transit track positioning mechanism 48, a carrier shuttle mechanism 50 and a hoist carriage mechanism 52. In the broadest sense, the transfer mechanism 46 is adapted to extend and retract relative to the hoist assembly 42, whereby to cause a workpiece and its associated carrier members to be transferred from one of the feeder track sections 26 to a position wherein the carrier members are supported on the transit track 44, and at such time as the crane assembly 34 is positioned adjacent the cubicle 16 within which the workpiece is to be stored, the transfer mechanism 46 effects the transfer of the workpiece and carrier members from the transit track 44 onto the support track 36 in the respective cubicle 16. The mechanism 46 also functions to transfer the stored workpieces back onto the transit track 44 when the workpiece is to be delivered to one of the feeder track sections 32 and thereafter effects the actual transfer of workpieces and associated carrier members from the transit track 44 to the associated track section 32. Also in the broadest sense, the rotary positioning mechanism 48 functions to rotationally position the transit track 44 so that it is in alignment with the associated feeder track sections 26 at the time of receiving a new carrier member and workpiece therefrom, and to position the transit track 44 relative to the support tracks 36 in the cubicles 16 as the workpiece and carrier member are transferred thereto preparatory to being stored. The shuttle mechanism 50 functions to move the transit track 44 laterally between the confronting rows of the cubicles 16 so as to assure proper alignment of the track 44 with the support tracks 36 in the cubicles 16 yet prevent any interference between the cubicle rows 12 and the transit track 44 as the stacker crane assembly moves along the aisles 14. Finally, the hoist carriage assembly 42 functions to operatively support the entire hoist assembly on the support column 38 for vertical adjustable movement, as will hereinafter be described.

Figure 10:
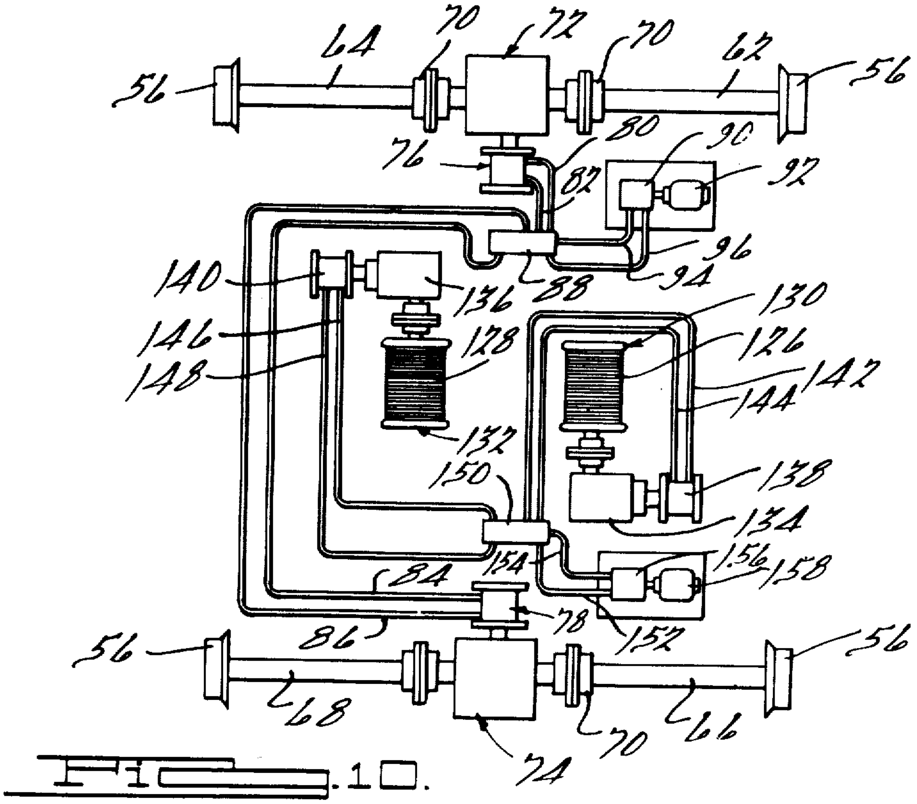
FIG. 10 is a schematic representation of a portion of the hydraulic circuitry and control system embodied in the stacker storage system of the present invention.

Referring now in detail to the construction and operation of the crane carriage assembly 40, as best seen in FIGS. 2 and 10, the assembly 40 comprises a generally rectangular shaped housing 54 that is provided with a plurality of rotatably mounted drive wheels, generally designated 56, that are located at the opposite ends of the housing 54, as shown in FIG. 2. The drive wheels 56 are adapted to ride upon and support the assembly 40 for longitudinal movement along a pair of spaced parallel rails or tracks 58 and 60 which are arranged adjacent the upper ends of the cubicle rows 12 at a position aligned with the associated transfer aisle 14. The rails 58, 60 may be supported in any suitable manner as, for example, by being mounted on the upper ends of the vertical frame members 18, as shown in FIG. 2.

The drive wheels 56 of the carriage assembly 40 are adapted to be operatively supported and driven by means of suitable axles 62, 64, 66 and 68 which are connected at their inboard ends through suitable coupling devices 70 to a pair of speed reducing mechanisms 72 and 74. The mechanisms 72, 74 are adapted to be actuated by means of a pair of hydraulic motors or the like 76 and 78, respectively, which are located adjacent the mechanisms 72, 74 within the housing 54. The motors 76, 78 are adapted to be supplied with suitable hydraulic actuating fluid through hydraulic conduits 80, 82 and 84, 86, respectively, which are communicable with a hydraulic manifold 88, as shown in FIG. 10. Fluid pressure is provided within the manifold 88 by means of a suitable hydraulic pump 90 and associated drive motor 92, the former of which is communicable with the manifold 88 through suitable hydraulic conduits 94 and 96. It will be seen that upon energization of the motor 92, fluid pressure will be generated within the manifold 88 by means of the pump 90, resulting in actuation of the hydraulic motors 76 and 78, with the result that the axles 62–68 will be simultaneously driven in synchronism through the speed reducing mechanisms 72, 74, to effect the desired rotation of the drive wheels 56, thus effecting longitudinal movement of the crane carriage assembly longitudinally of the rails 58, 60. It will be apparent, of course, that suitable controls of the type well known in the art may be provided in the drive mechanism of the carriage assembly 40 whereby said assembly may be moved in either direction along the rails 58, 60 in accordance with the desired movement of the workpieces to and from the various cubicles 16. It will also be readily apparent that various alternative types of drive systems may be incorporated in the carriage assembly 40 and that the aforementioned system, although being a preferred arrangement, is not considered to be absolutely essential to the overall operation of the present invention.

Figure 12:
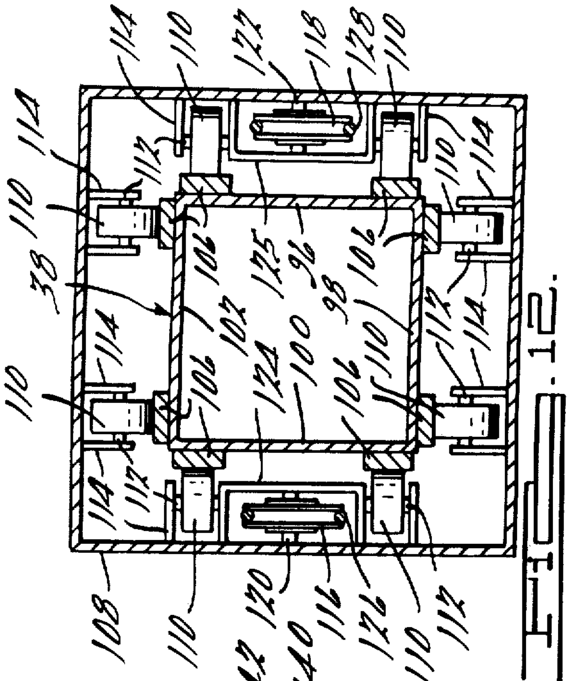
FIG. 12 is a cross-sectional view taken transversely through the support column and hoist carriage mechanism of the present invention.

As best illustrated in FIG. 12, the support column 38 is generally square in horizontal cross section and comprises four vertically extending sides 98, 100, 102 and 104. Mounted on each of the sides 98-104 is a pair of spaced parallel and vertically extending bearing plates or tracks, generally designated 106, which are adapted to function in a manner hereinafter to be described for providing smooth vertical movement of the hoist assembly 42 along the length of the support column 38. As was previously mentioned, the column 38 is fixedly secured at the upper end thereof to the carriage assembly 40 and is thereby adapted to move longitudinally of the associated transfer aisle 14 along with the assembly 40.

Referring now in detail to the construction and operation of the hoist assembly 42, and in particular to the hoist carriage mechanism 52 thereof, as best seen in FIGS. 2 and 12, the carriage mechanism 52 comprises a generally square shaped housing 108 which extends entirely around the support column 38. The housing 108 is provided with a plurality of rollers, generally designated 110, which are supported internally thereof at a position so as to rotatably engage the outer surfaces of the bearing tracks 106. The rollers 110 are rotatably supported by means of suitable axles or shafts, generally designated 112, that are mounted by axle support members 114 on the inboard sides of the housing 108. It will be noted that the rollers 110 and bearing tracks 106 are preferably dimensioned such that very low tolerances are provided therebetween, whereby a minimum of lateral movement or "slop" exists between the carriage mechanism 52 and the support column 38.

Generally speaking, the entire hoist assembly 42 is adapted to be raised or lowered along the support column 38 by means of a system of elevating and lowering cables which extend around suitable rotatable pullies located within the carriage mechanism 52, which cables are adapted to be wound upon suitable rotatable drums or winch mechanisms located within the housing 54 of the crane carriage assembly 40. More particularly and as best illustrated in FIGS. 10 and 12, it will be seen that a pair of rotatable pullies 116 and 118 are mounted adjacent the opposite sides of the housing 108 by means of suitable shafts or axles 120 and 122, respectively, with the pullies 116, 118 being enclosed within suitable partitions 124 and 125, respectively, secured to the inboard sides of the housing 108 of the carriage mechanism 52. The pullies 116 and 118 are adapted to have a pair of cables 126 and 128 pass around the lower sides thereof, which cables 126, 128 each having one end thereof fixedly secured within the crane carriage assembly 40, with the opposite ends thereof being affixed to a pair of rotatable drums 130 and 132, respectively. The drums 130, 132 are adapted to be rotated or driven by means of a pair of speed reducing mechanisms 134, 136 which are in turn driven in synchronism by a pair of hydraulic motors 138, 140, respectively. Actuation of the motors 138, 140 is achieved by supplying pressurized hydraulic fluid through conduits 142, 144 and 146, 148, respectively, which are communicable with a fluid manifold 150. Pressurized fluid is supplied to the manifold 150 by means of suitable conduits 152 and 154 that are communicable with a suitable fluid pump 156 that is actuated by an associated drive motor 158. It will be seen that proper actuation of the hydraulic motors 138, 140 will result in rotation of the drums 130, 132, resulting in the cables 126 and 128 being wound or unwound from the drums 130, 132, respectively. At such time as the cables 126, 128 are wound upon the drums 130, 132, the carriage mechanism 52 and hence the entire hoist assembly 42 will be raised or elevated along the support column 38 some predetermined amount. Similarly, when the cables 126, 128 are unwound from the drums 130, 132, the hoist assembly 42 will be lowered along the support column 38 some predetermined amount. It will be apparent, of course, that various alternative devices may be used for effecting vertical adjustable movement of the hoist assembly 42 along the support column 38, and that rotational movement of the drums 130, 132 or similar winding or unwinding devices for the cables 126, 128 may be accomplished by means other than the aforedescribed hydraulic system without departing from the broadest aspects of the present invention.

In accordance with the present invention, it is desired for efficiency of operation and space utilization to have the stacker crane assembly 34 be adapted to insert and retrieve workpieces and their associated carrier members from the cubicles 16 of the cubicle rows 12 along both sides of each of the aisles 14. That is, it is desirable that each of the stacker crane assemblies 34 be adapted to receive workpieces from the feeder track sections 26 and insert them in the cubicles 16 along either side of the aisles 14, and similarly, that the assemblies 34 are able to retrieve workpieces from the cubicles 16 along either side of the aisles 14 preparatory to transferring these workpieces to the feeder track sections 32 of the outboard conveyor track 28. In order to enable smooth, interference free longitudinal movement of the stacker crane assemblies 34 along the transfer aisles 14, yet permit pick up and delivery of the workpieces along both sides of the aisles 14, it is desirable that the transit track 44 be spaced laterally inwardly from the confronting sides of the cubicles 16 during longitudinal transit thereof, yet be capable of moving laterally in either direction into operative engagement with the support tracks 36 in the cubicles 16 as workpieces are inserted into and retrieved from the cubicles 16. In order to achieve such selective lateral positioning of the transit track 44, the hereinbefore referred to shuttle mechanism 50 is provided on the hoist assembly 42 of each of the stacker crane assemblies 34.

Figure 3:
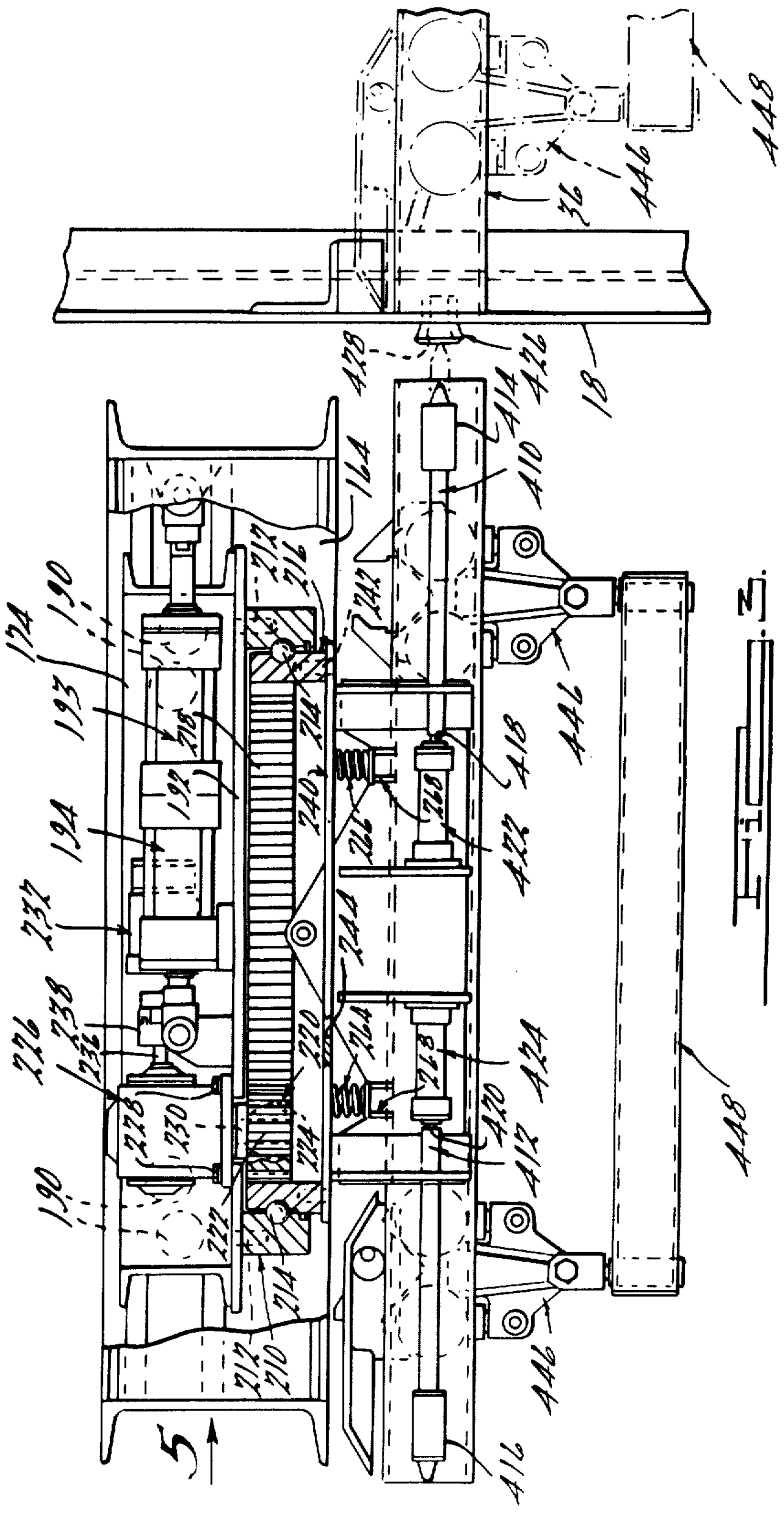
FIG. 3 is a fragmentary cross-sectional view of a portion of the hoist assembly illustrated in FIG. 2.
Figure 4:
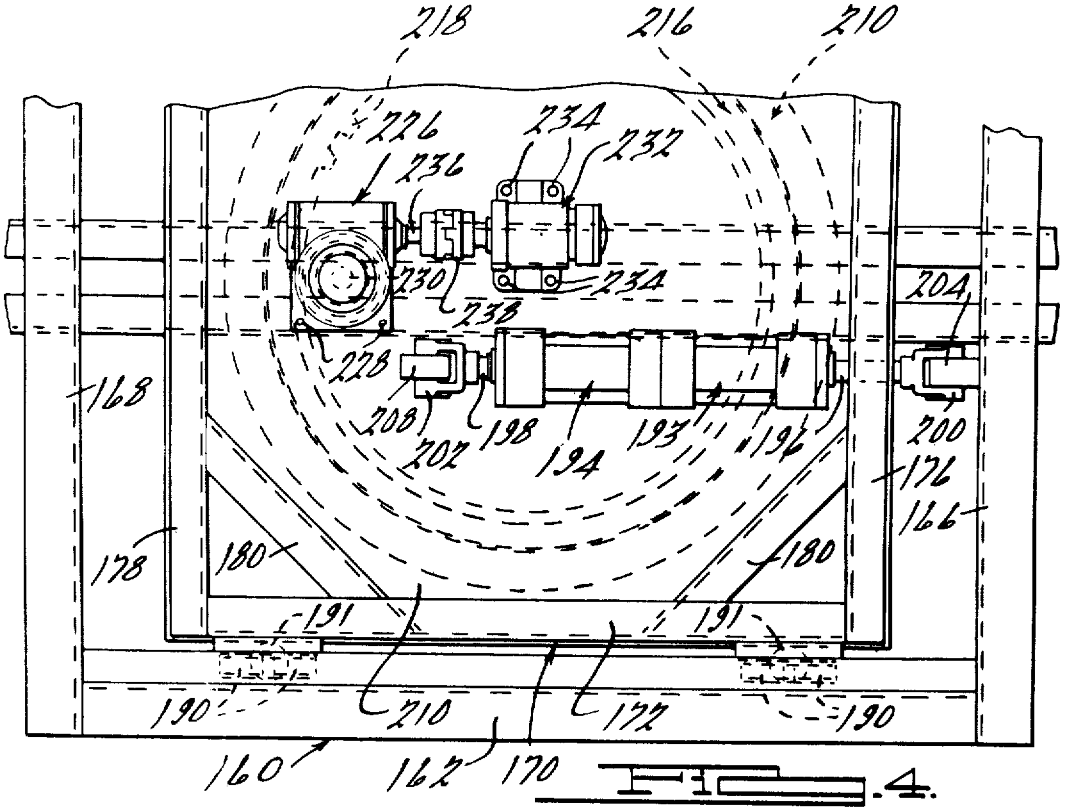
FIG. 4 is a fragmentary top elevational view of the structure illustrated in FIG. 3.

Referring now in detail to the construction and operation of the shuttle mechanism 50 which is operatively associated with the stacker crane assembly 34 illustrated in FIG. 2, as best shown in FIGS. 3 and 4, said mechanism 50 comprises a generally rectangular shaped main frame 160 which is rigidly and fixedly mounted on the hoist assembly 42 and comprises a pair of laterally extending side sections 162 and 164 and a pair of longitudinally extending side sections 166 and 168. Disposed interiorly of the main frame 160 and in substantial coplanar relation therewith is a generally rectangular shaped shuttle frame 170 comprising a pair of laterally extending side sections 172, 174 and a pair of longitudinally extending side sections 176, 178. As best seen in FIG. 4, the corresponding sides of the main frame 160 and shuttle frame 170 are arranged in spaced parallelism, with the shuttle frame 170 being provided with suitable rigidifying or strengthening diagonal reinforcing members, generally designated 180.

Figure 5:
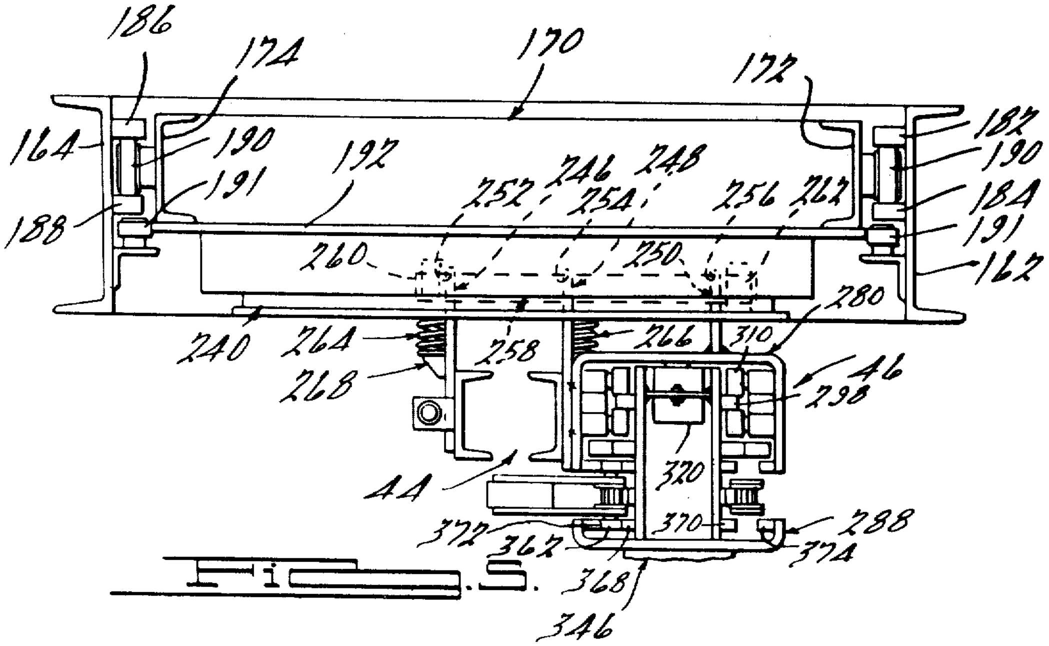
FIG. 5 is an end elevational view of the structure illustrated in FIG. 3, as taken in the direction of the arrow 5 thereof.

The laterally extending side sections 162 and 164 of the main frame 160 provides a pair of spaced parallel rails or tracks which are defined by vertically spaced pairs of guideways 182, 184 and 186, 188 that are secured to the inboard sides of the side sections 162 and 164, as best seen in FIG. 5. The laterally extending side sections 172, 174 of the shuttle frame 170 are provided with pairs of rollers, generally designated 190, at the laterally outer ends thereof, which rollers 190 are adapted to be received between and guided by the guideways 182, 184 and 186, 188, thereby providing for relative lateral movement of the shuttle frame 170 with respect to the main frame 160. As best seen in FIG. 3, the rollers 190 of each of said pairs are vertically offset a predetermined amount so as to firmly engage the guideways 182, 184 and 186, 188 and thereby prevent any relative upward or downward movement of the shuttle frame 170 relative to the main frame 160. As best seen in FIG. 5, a plurality of horizontally disposed rollers 191 are mounted along the inboard sides of the laterally extending main frame sections 162 and 164 at a position adapted to engage the laterally outer edges of a bottom plate 192 that extends across the lower side of the shuttle frame 170, whereby to prevent any relative longitudinal movement between the shuttle frame 170 and main frame 160.

Means for providing the desired lateral or shuttle movement of the shuttle frame 170 with respect to the main frame 160, and hence relative to the entire hoist assembly 42, is provided by a pair of pressure fluid operated piston and cylinder assemblies 193 and 194 that are arranged in substantial colinear relation within the confines of the shuttle frame 170. The assemblies 193, 194 comprise piston rods 196, 198, respectively, which are secured through suitable bifurcated clevises 200 and 202 to suitable mounting lugs 204 and 208 that are fixedly attached to the main frame side section 166 and the bottom plate 192.

During normal longitudinal transit of the stacker crane assembly 34 along its respective aisle 14, the shuttle frame 170 is disposed in the neutral or center position shown in FIG. 4; however, when it is desired to move the shuttle frame 170 laterally toward the right in FIG. 4 or toward the side section 166 of the main frame 160, the piston and cylinder assembly 193 is energized in a preselected manner whereby to cause the piston rod 196 to move laterally inwardly with respect to the assembly 193. Similarly, when it is desired to move the shuttle frame 170 back toward its neutral position, i.e., laterally inwardly, the piston and cylinder assembly 193 will be again actuated in a suitable manner. The piston and cylinder assembly 194 functions in a similar manner when it is desired to bias the shuttle frame 170 from its neutral or center position toward the left in FIG. 4, i.e., toward the side section 168 of the main frame 160, and proper energization of the piston and cylinder assembly 194 will result in return of the shuttle frame 170 to its neutral position. It is contemplated that a lateral travel of approximately 2½ inches from either side of the neutral position shown in FIG. 4 is all that is necessary to provide for interference free transit of the stacker crane assemblies 34 along the aisles 14, yet permit the smooth transfer of workpieces between the hoist assemblies 42 thereof and the cubicles 16, although it will be apparent that such an amount of travel may be varied in accordance with various installations and operational environments.

Generally speaking, the rotary transit track positioning mechanism 48 is designed to effect rotational movement of the transfer mechanism 46 and transit track 44 relative to the hoist assembly 42. More particularly, it will be seen in FIGS. 1 and 2 that the ends of the feeder track sections 26 and 32 adjacent the storage complex 10 extend longitudinally of the workpiece transfer aisles 14, but that the support tracks 36 in each of the cubicles 16 extend substantially perpendicular or at right angles to the aisles 14. Thus, it is necessary that the rotary positioning mechanism 48 function to longitudinally align the transit track 44 with the ends of the feeder track sections 26, 32, i.e., orient the track 44 parallel to the lengths of the aisles 14, when workpieces and their associated carrier members are transferred to or from the track sections 26, 32, and be capable of rotating the transit track 44 approximately 90° in either direction relative to the length of the aisles 14 so that the track 44 is aligned with the support tracks 36 in the cubicles 16, whereby the workpieces and their associated carrier members may be either inserted or retrieved from the cubicles 16 along either side of the cubicle rows 12.

Referring now in detail to the construction and operation of the positioning mechanism 48, as best seen in FIGS. 3 and 4, the mechanism 48 is shown as comprising a generally circular shaped or annular guide ring 210 that is secured by means of suitable screws, bolts or the like 212 to the lower side of the bottom plate 192. The ring 210 functions as an outer race for a plurality of anti-friction bearings or the like 214 adapted to rotatably support an annular ring gear 216 radially interiorly of the ring 210, whereby the ring gear 216 is rotatable with respect to the ring 210 and hence relative to the shuttle frame 170. The ring gear 216 is provided with a plurality of radially inwardly directed gear teeth 218 on the radially inner side thereof and is adapted to be selectively rotated by means of a pinion gear 220 having gear teeth 222 that are meshingly engageable with the teeth 218. The pinion gear 220 is rotatably mounted on the lower side of the bottom plate 192 and is provided with an internal clutch mechanism 224 adapted to drivingly connect a speed reducing mechanism 226 with the pinion gear 220. As shown in FIG. 3, the speed reducing mechanism 226 is secured to the upper side of the bottom plate 192 by means of suitable screws, bolts or the like 228 and is provided with a drive shaft 230 which drivingly communicates with the clutch 224. The speed reducing mechanism 226 is adapted to be actuated by means of a suitable hydraulic or similar type motor 232 secured to the upper side of the bottom plate 192 by suitable screws, bolts or the like 234 and drivingly connected to an input shaft 236 of the mechanism 226 by means of a suitable drive coupling arrangement 238. It will be seen that upon proper energization of the motor 232, rotary movement will be imparted to the pinion gear 220 and hence to the ring gear 216 drivingly connected thereto. The clutch mechanism 224 is designed to disengage the drive shaft 230 from the pinion gear 220 so that the reducing mechanism 226 and motor 232 will not be damaged in the event rotation of the ring gear 216 is in any way hampered. It will be noted that the motor 232 is of the reversible type so that the ring gear 216 may be rotated in either direction pursuant to the operation of the stacker crane assembly 34, as will later be described.

Referring now in detail to the construction and operation of the transfer mechanism 46, as best seen in FIG. 5, said mechanism 46, along with the transit track 44 are located directly below the rotary positioning mechanism 48 and are adapted to be secured thereto in a manner such that rotation of the ring gear 216 results in simultaneous rotation in the same direction of the transfer mechanism 46 and track 44. As illustrated in FIG. 3, a generally flat, horizontally extending annular plate 240 is secured to the lower side of the ring gear 216 by means of suitable screws, bolts or the like 242. The plate 240 is provided with a substantially centrally located opening 244 through which the upper ends of three spaced parallel support ribs 246, 248 and 250 extend. The lower ends of the ribs 246, 248 and 250 are fixedly secured to the transfer mechanism 46 and transit track 44 in a manner later to be described.

The upper ends of the ribs 246, 248 and 250 are formed with coaxially aligned openings 252, 254 and 256, respectively, which are adapted to receive and be fixedly secured to a generally horizontally extending pivot shaft 258 that is pivotably mounted by means of a pair of pillow blocks 260 and 262 attached to the upper surface of the plate 240 adjacent the opposite sides of the openings 244 therein. The ribs 246, 248 and 250, together with the shaft 258 and pillow blocks 260, 262, are adapted to support the transfer mechanism 46 and transit track 44 for limited pivotal movement with respect to the hoist assembly 42, whereby to permit the smooth transfer of workpieces and their associated carrier members between the track sections 26, 32 and the transit track 44, and between the track 44 and the support tracks 36 in the cubicles 16 in the event there is any slight misalignment during the workpiece transfer, as will later be described in detail. A pair of balance springs 264 and 266 are interposed between the lower side of the plate 240 and a pair of support brackets 268 that are secured to the ribs 246 and 248. The balance springs 264, 266 are intended to maintain the transfer mechanism 46 and transit track 44 in substantial horizontal positions, i.e., substantially parallel to the plane of the plate 240, yet permit the mechanism 46 and track 44 to pivot slightly about the pivotal axis defined by the shaft 258 in the event there is any misalignment between the track 44 and the feeder track sections 26, 32 or support tracks 36 during the transfer of workpieces and their associated carrier members therebetween.

Figure 6:
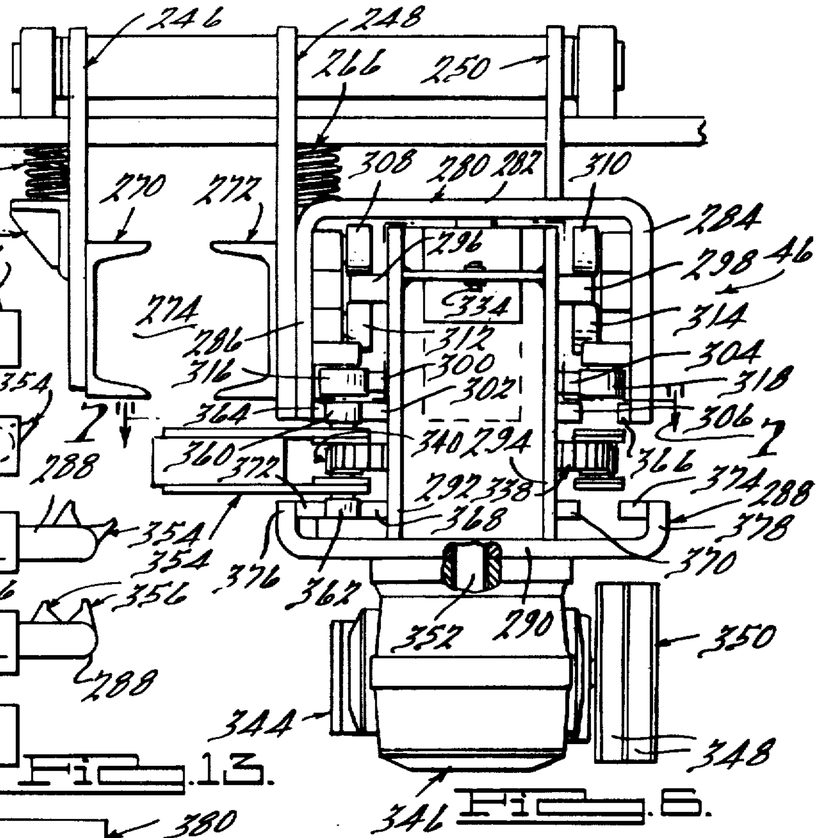
FIG. 6 is an enlarged view similar to FIG. 5 illustrating the drive motor of the transfer mechanism thereof.

As best seen in FIGS. 5 and 6, the transit track 44 comprises a pair of elongated, spaced parallel channel sections 270 and 272 which are generally C-shaped in transverse section and are fixedly secured to the support ribs 246 and 248, respectively. The channel sections 270, 272 define an internal track or guideway 274 adapted to receive the carrier members that support the various workpieces during transit along the conveyor tracks 22 and 28. In a preferred construction of the present invention, the channel sections 270, 272 are substantially identical in construction as the conveyor tracks 22, 28 and feeder track sections 26, 32. As shown in FIG. 2, the support tracks 36 in each of the storage cubicles 16 also each comprise a pair of generally C-shaped confronting channel sections 276 and 278 which are preferably of the same size and configuration as the channel sections 270, 272 of the transit track 44 and the aforesaid conveyor tracks 22, 28, whereby to provide for the smooth transfer of the carrier members and workpieces supported thereby between the hoist assembly 42 and the conveyor tracks 22, 28 and cubicles 16.

Generally speaking, the transfer mechanism 46 of each of the stacker crane assemblies 34 comprises a housing section secured to and supported by the ribs 248, 250 on the rotary positioning mechanism 48, and a transfer carriage which is adapted to be advanced and retracted relative to the fixed housing section. The transfer carriage is provided with a rotatable chain and means for effecting selective rotation thereof, the chain carrying a plurality of dog members which are adapted to selectively engage the carrier members which support the workpieces on the feeder track sections 26, 32 and on the support tracks 36 of the cubicles 16, whereby proper rotation of the chain and dogs thereon will effect the transfer of the carrier members and workpieces supported thereby to and from the guideway 274 of the transit track 44.

Referring now in detail to the construction and operation of the transfer mechanism 46, as best seen in FIG. 6, the mechanism comprises an elongated, generally inverted U-shaped housing 280 having a flat horizontally extending upper side portion 282 and spaced parallel and generally vertically disposed side portions 284 and 286. The housing 280 is rigidly secured to the support ribs 248 and 250 by any suitable means as, for example, welding or the like, whereby the housing 280 is pivotably supported, along with the transit track 44 by means of the pivot shaft 258 on the annular plate 240. Disposed directly below and aligned with the housing 280 is an elongated transfer carriage member 288 which comprises a generally flat horizontally extending bottom plate portion 290 which is disposed substantially parallel to the upper side portion 282 of the housing 280. The transfer carriage member 288 comprises a pair of upwardly extending spaced parallel intermediate members 292 and 294 which are provided with a pair of elongated upper guideway rails 296 and 298, respectively, on the outboard sides thereof. The members 292, 294 are also provided with two pair of lower guideway rails 300, 302 and 304, 306, respectively, as illustrated in FIG. 6. The upper rails 296, 298 are adapted to ride between a plurality of upper roller members 308, 310 and intermediate roller members 312, 314 rotatably mounted on the inboard sides of the side portions 286 and 284 of the housing 280, with the result that the transfer carriage 288 is supported for longitudinal sliding movement relative to the housing 280. A plurality of lower rollers 316 and 318, which are rotatable about generally vertical axes, are also provided on the inboard side portions 286, 284 of the housing 280 and adapted to bear against the laterally outer sides of the guideway rails 300 and 304, whereby to minimize any lateral shifting movement between the transfer carriage 288 and the housing 280 during longitudinal movement of the transfer carriage 288 with respect to the housing 280.

Figure 7:
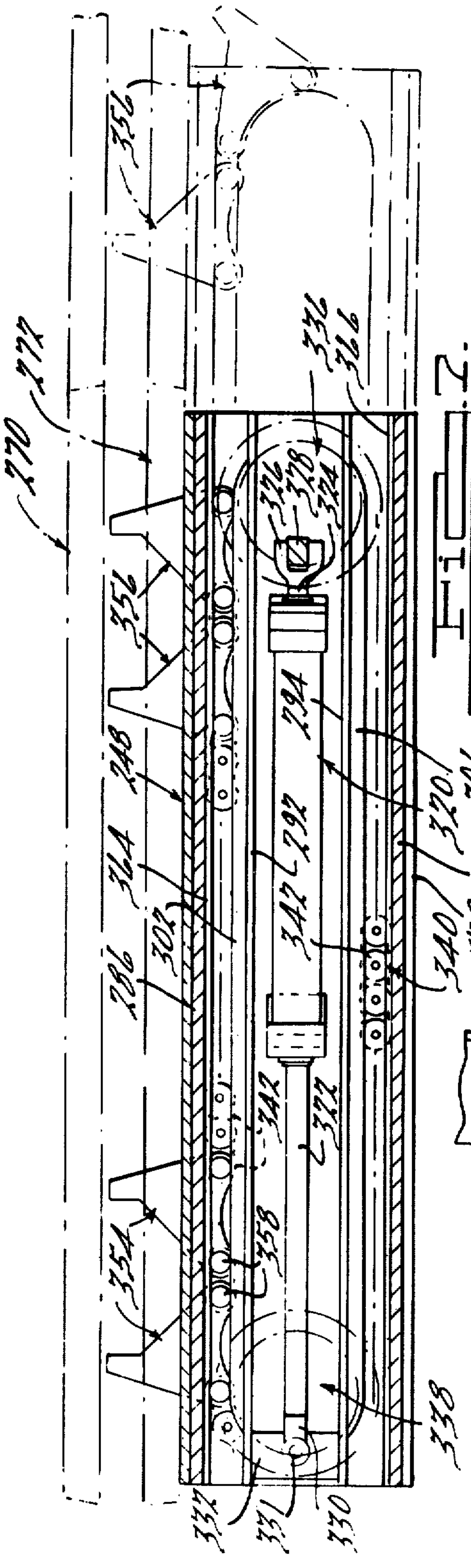
FIG. 7 is a cross-sectional view illustrating a portion of the transfer mechanism incorporated in the hoist assembly of the present invention, as taken substantially along the line 7—7 of FIG. 6.

Means for effecting advancement and retraction of the transfer carriage 288 relative to the fixed housing 280 is provided by a piston and cylinder assembly 320 that is disposed interiorly of the housing 280, as best seen in FIG. 7. The assembly 320 comprises a pair of opposed, reciprocally mounted piston rods 322 and 324, the latter of which is secured by means of a conventional yoke-like clevis member 326 to a mounting lug 328 on the upper side portion 282 of the housing 280, and the former of which is secured by means of a suitable clevis member 330 and locking pin 331 to a generally flat, horizontally extending web member 332 that extends laterally between the intermediate members 292, 294. Upon proper energization of the piston and cylinder assembly 320, the piston rod 322 will be advanced toward the right in FIG. 7, thereby causing the transfer carriage 288 to be moved toward the right in this Figure. Similarly, deenergization of the assembly 320 will effect retraction of the piston rod 322 and simultaneous retraction of the transfer carriage 288 relative to the housing 280. Likewise, proper energization and deenergization of the piston and cylinder assembly 320 will effect advancement and retraction of the piston rod 324 which will result in concomitant advancement and retraction of the transfer carriage 288 toward and away from the dotted line position shown in FIG. 7, as will hereinafter be described in detail.

As best seen in FIG. 7, the transfer carriage 288 is provided with a pair of rotatably mounted sprocket members 336 and 338 which are adapted to rotatably carry a suitable link type chain 340 of the type well known in the art and comprising a plurality of relatively pivotal chain links, generally designated by the numeral 342. As best seen in FIG. 6, a hydraulic or similar type drive motor 344 is mounted on the lower side of the transfer carriage 288 and is adapted to be drivingly connected to a speed reducing mechanism 346 by means of a pair of suitable drive belts 348 carried on a conventional pulley 350. The speed reducing mechanism 346 is of the right angle drive type and comprises a generally vertically or upwardly extending drive shaft 352 which projects through the bottom plate portion 290 and is drivingly engaged with the sprocket 338, with the result that proper energization of the motor 344 will effect rotation of the drive shaft 352 and sprocket 338 and hence rotational movement of the drive chain 340 around the sprockets 336, 338. It will be noted that the motor 344 is of the reversible type, whereby rotational movement of the drive chain 340 in either direction, i.e., clockwise or counterclockwise in FIG. 7, may be achieved.

Referring again to FIG. 7, the drive chain 340 is provided with two pair of carrier member engaging dogs 354 and 356 which are pivotably connected to the drive chain 340 by means of the pivot pins, generally designated 358, which operatively connect the various chain links 342 to one another. The pairs of dogs 354, 356 are spaced from one another along the length of the chain 340 a predetermined amount in accordance with the size and type of carrier members with which workpieces are conveyed along the conveyor tracks 22 and 28, and it should be noted that the spacing shown herein may be varied in accordance with the size, number and construction of such carrier members. As will be described in detail with connection with the description of the overall operation of the stacker crane assembly 34, the dogs 354, 356 are adapted to be rotated relative to the sprocket members 336, 338 upon proper rotation of the drive chain 340, as generally shown by the dotted line position of the dogs 356 in FIG. 7. As best illustrated in FIG. 6, the pivot pins 358 which operatively secure the dogs 354, 356 to the drive chain 340 carry guide rollers 360 and 362 above and below the dogs 354 and 356. The rollers 360 are adapted to be confined between the lower guideway rails 302, 306 and associated rails 364, 366 that are provided on the inboard sides of the side portions 286, 284, respectively, of the housing 280. In a similar manner, the guide rollers 362 are adapted to be confined between outwardly extending guideway rails 368, 370 and 372, 374 provided on the outboard sides of the intermediate members 292, 294 of the transfer carriage 288 and on upwardly extending peripheral flange sections 376, 378 formed along the bottom plate portion 290 of the carriage 288. The guide rollers 360, 362, although being confined between the aforesaid guideway rails, are adapted to move longitudinally therealong upon rotation of the drive chain 340 and dogs 354, 356 around the sprockets 336, 338, whereby to minimize any relative lateral movement or slop between the drive chain 340 and the transfer carriage 288.

Figure 11:
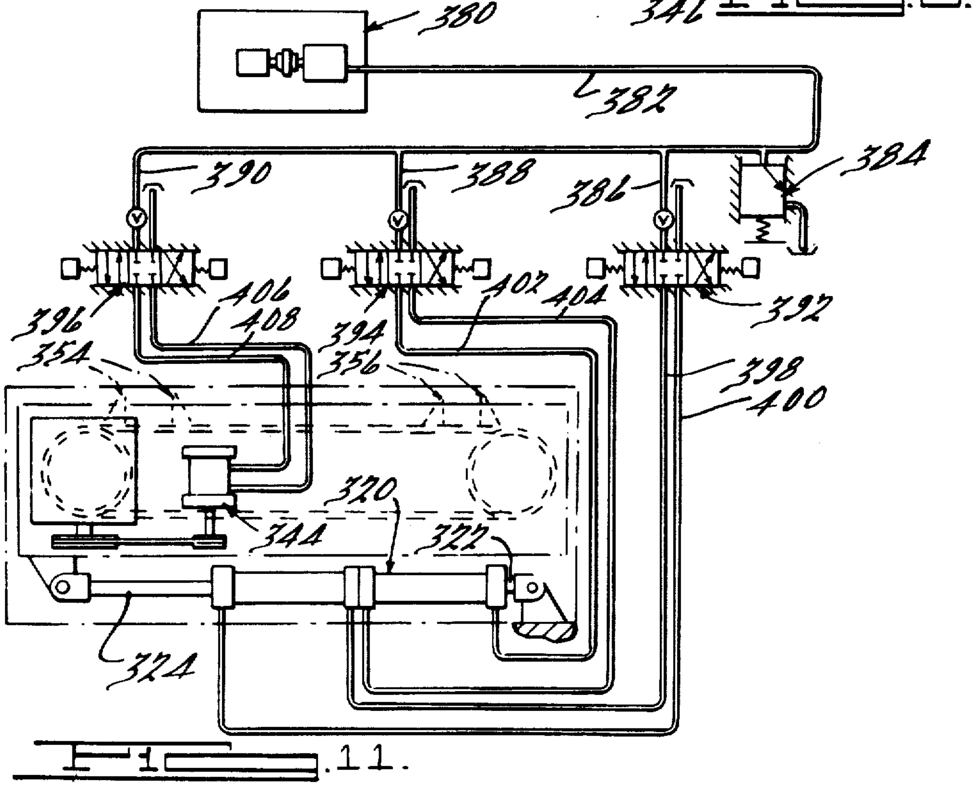
FIG. 11 is a schematic representation of another portion of the hydraulic circuitry and control system of the present invention.

It will be noted that the hydraulic motor 344 and piston and cylinder assembly 320 may be selectively actuated by means of various suitable types of control systems and hydraulic circuitry; however, for purposes of clarity of description and understanding, a preferred hydraulic system for operating the assembly 320 and motor 344 is illustrated in FIG. 11. More particularly, the hydraulic motor 344 and piston and cylinder assembly 320 are shown in operative association with a suitable fluid pressure pumping assembly, generally designated 380, having a fluid outlet line or conduit 382 that is provided with a suitable pressure relief valve assembly 384. The fluid conduit 382 is communicable with a plurality of associated fluid conduits 386, 388 and 390 which are in turn communicable with a plurality of multi-position solenoid operated hydraulic valve assemblies 392, 394 and 396, respectively. The valve assemblies 392–396 may be of any conventional type but are preferably of the type adapted to be actuated and deactuated by conventional position responsive limit switches (not shown) which may be selectively actuated by preselected movement of the various components of the hoist assembly 42, whereby to control the flow of hydraulic fluid to and from the piston and cylinder assembly 320 and hydraulic motor 344 in a sequential manner commensurate with the overall operation of the stacker crane assembly 34 hereinafter to be described. The exact location of such limit switches for effecting actuation of the valve assemblies 392–396 will vary with the various installations of the present invention, and since the use of such limit switches is well known to those skilled in the art, the exact placement of such switches has been omitted herein.

The valve assembly 392 is connected in a conventional manner through a pair of fluid conduits 398 and 400 to the portion of the piston and cylinder assembly 320 which controls reciprocation of the piston rod 324. Similarly, the valve assembly 394 is connected through fluid conduits 402 and 404 with the portion of the assembly 320 which controls selected actuation of the piston rod 322; thus, it will be seen that upon proper actuation of the valve assemblies 392, 394, the piston rods 322 and 324 may be made to retract and advance as desired. The valve assembly 396 is connected through suitable hydraulic conduits 406 and 408 to the hydraulic motor 344 for supplying hydraulic actuating fluid thereto, with suitable actuation of the valve assembly 396 being effective to drive the motor 344 in one direction or the other, hence controlling the direction of rotation of the drive chain 340 and dogs 354, 356.

In order to assure that the transit track 44 is properly aligned with the support tracks 36 of each of the cubicles 16 as workpieces and their associated carrier members are inserted and retrieved therefrom, means in the form of a pair of laterally extending, colinearly aligned advanceable and retractable locating pins or rods 410 and 412 are provided on the channel section 270 of the transit track 44. As best seen in FIG. 3, the laterally outer ends of the locating pins 410, 412 are reciprocally mounted within suitable guide blocks 414 and 416, respectively, and the laterally inner ends of the pins 410 and 412 are fixedly attached to the outer ends of a pair of piston rods 418 and 420, respectively, of a pair of piston and cylinder assemblies 422 and 424 mounted on the transfer mechanism 46. Upon proper energization of the piston and cylinder assemblies 422, 424, the piston rods 418, 420 will be advanced laterally outwardly, thereby biasing the locating pins 410, 412 outwardly as, for example, to the dotted line position of the locating pin 410 in FIG. 3.

Disposed directly adjacent the support track 36 of each of the cubicles 16 is a locating pin receiving collar 426 having a generally enlarged laterally inwardly extending mouth or opening 428. The collars 426 are adapted to receive the laterally outer ends of the locating pins 410, 412 which, as shown in FIG. 3, are substantially pointed, and thereby guide the transit track 44 into positive alignment with the support tracks 36 in the associated cubicles 16. It will be noted that the enlarged mouths 428 of each of the collars 426 function as centralizing or alignment means to assure reception of the outer ends of the locating pins 410, 412 within the collars 426 in the event there may be any slight misalignment therebetween.

Figure 9:
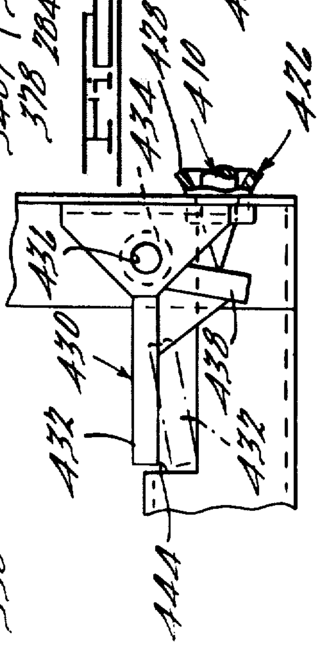
FIG. 9 is an enlarged side elevational view of the apparatus illustrated in FIG. 8.
Figure 8:
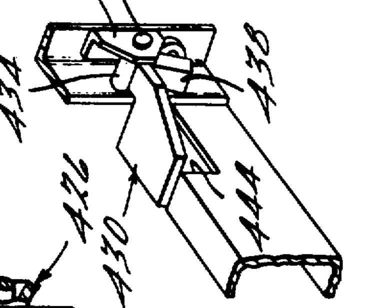
FIG. 8 is an elevated perspective view of a portion of one of the carrier retaining devices incorporated in each of the component storage cubicles illustrated in FIG. 2.

Referring now to FIGS. 8 and 9, each of the support tracks 36 in the cubicles 16 is provided with means for preventing the carrier members and workpieces supported on the tracks 36 from rolling laterally inwardly toward the aisles 14 and thereby falling out of the cubicles 16. Such means is provided by a holdback latch 430 that is pivotably mounted adjacent one of the channel sections 276 or 278 of each of the support tracks 36. Each of the holdback latches 430 comprises a generally flat tongue section 432 that if fixedly secured at one end thereof to an annular sleeve section 434 which defines a central annular bore 436. Extending downwardly from the sleeve section 434 is a locating pin engaging portion 438 which is also fixedly secured to the sleeve section 434. The holdback latches 430 are adapted to be pivotably mounted by means of suitable pivot pins or the like 440 extending through the bores 436 and suitable mounting brackets 442 rigidly attached to an adjacent portion of one of the vertical frame members 18 of the cubicle rows 12. As illustrated in FIG. 9, the holdback latches 430 are mounted such that the portions 438 thereof are disposed directly behind the collars 426 in a manner such that when one of the locating pins 410, 412 is received within a collar 426, the laterally outer end of the pin 410, 412 engages the latch portion 438, thereby biasing the latch tongue section 432 from the dotted line position shown in FIG. 9 to the solid line position shown in this Figure. It will be seen that the holdback latches 430 are normally disposed in positions wherein the tongue sections 432 thereof are received within generally rectangular recesses 444 in the associated channel sections 276 or 278, i.e., in the dotted line position in FIG. 9, and that the tongue sections 432 thereby prevent any of the carrier members on the support tracks 36 from moving laterally inwardly toward the aisle 14. Thus, the holdback latches 430 provide a positive stop against inadvertent inward movement of the carrier members; however, when the holdback latches 430 are biased to the solid line position in FIG. 9 by lateral outward movement of the locating pins 410 or 412, the tongue sections 432 thereof are disposed in substantial coplanar relation with the top or upper surfaces of the support tracks 36, whereby to permit the smooth, interference free transfer of carrier members and their associated workpieces between the tracks 36 and transit track 44.

In order to facilitate understanding the various component assemblies and mechanisms of the stacker storage system of the present invention, a brief description of a typical operational cycle thereof will now be given.

Assuming the initial condition that a workpiece is supported on the end of one of the feeder track sections 26 of the inbound conveyor track 22 by means of one or more carrier members, generally designated 446 (see FIG. 3), the drive motor 92 of the crane carriage assembly 40 is initially energized whereby to effect longitudinal movement of the assembly 40 along the tracks 58 and 60, with the result that the support column 38 and entire hoist assembly 42 carried thereby are moved to a position adjacent the end of the track section 26 upon which the workpiece is supported. It will be noted that the workpiece(s) may be of various character, and may be in the form of relatively large one piece assemblies or sub-assemblies, or, alternatively, may be in the form of bulk loads consisting of a multiplicity of smaller workpieces. In the event the workpieces are relatively large and are of such a nature that a single workpiece would be stored in each of the cubicles 16, such workpieces may be suspended or hung in any suitable manner directly from an intermediate trolley member, one of which is designated at 448 in FIG. 3 and connected at its opposite ends to and supported by a pair of carrier members 446. In the event the workpieces that are to be stored in the cubicles 16 are of a bulk or fungible character, such workpieces, instead of being suspended directly from the intermediate trolley member 448, may be supported by means of a storage container 449 of the type shown in FIG. 2 and comprising side walls 450, 452 and 454 and a bottom wall or platform 456. As illustrated in FIG. 2, the container 449 is supported by a generally L-shaped support arm 458 having a vertically extending portion 460 secured to the side wall 454, and a generally horizontally extending portion 462 which is adapted to be secured to the trolley member 448 or directly to one or more carrier members 446 by any suitable means. The support arm 458 is designed so as to support the container 449 directly below the transfer mechanism 46 and transit track 44 and permit transfer thereof along the aisles 14 and to and from the cubicles 16 without any interference between the adjacent cubicle rows 12 or frame members 18, 20. It will be readily apparent, of course, that various alternative type containers may be utilized for supporting particular types of workpieces on the carrier members 446 and trolley memb[illegible] 448, and that the container 449 shown herein is merely an exemplary construction of such a container.

Figure 13:
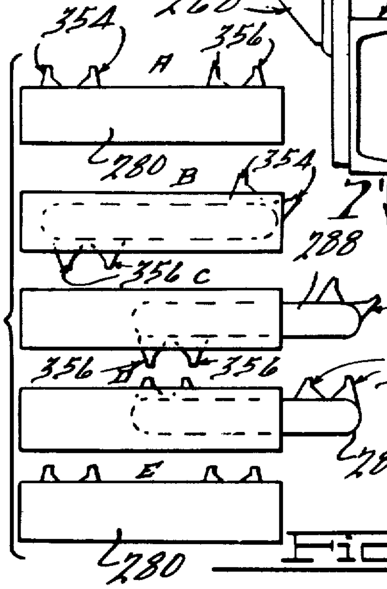
FIG. 13 is a schematic representation of a portion of the transfer mechanism of the present invention, as shown in its various operative positions during a typical operational cycle of the present invention.

Assuming that the rotary positioning mechanism 48 is actuated in a manner such that the transit track 44 and transfer mechanism 46 extend longitudinally of the aisle 14 along which the workpiece is to be transferred, and the associated stacker crane assembly 34 has been moved longitudinally of this aisle so as to be juxtapositioned the end of the feeder track section 26 upon which the workpiece is supported, the drive motor 344 is initially energized in a manner so as to rotate the drive chain 340 about the sprocket members 336, 338, whereby the dogs 354, 356 are rotated from the position shown in diagram A of FIG. 13 to the position shown in diagram B in this Figure. Thereafter, the piston and cylinder assembly 320 is actuated in a manner such that the transfer carriage 288 is extended or projects outwardly from the housing 280, i.e., to the position shown in diagram C of FIG. 13, wherein the dogs 354 are disposed directly adjacent the carrier members 446 supporting the workpiece on the feeder track section 26. The drive motor 344 is then actuated in a manner so as to rotate the drive chain 340 in a counterclockwise direction in diagram C of FIG. 13, whereby the dogs 354 and 356 will be moved from the position shown in diagram C in FIG. 13 to the position shown in diagram D of this Figure. As the dogs 354, 356 are thus rotated about the sprocket members 336, 338, the dogs 354, 356 will bias the carrier members 446 and hence the workpiece carried thereby longitudinally of the aisle 14, with the result that the carrier members 446 will be partially transferred off from the feeder track section 26 and onto the transit track 44 of the transfer mechanism 46. The piston and cylinder assembly 320 is again actuated to retract the transfer carriage 288 from the position shown in diagram D of FIG. 13 to the position shown in E of this Figure, at which time the carrier members 446 and workpiece supported thereby will be completely transferred onto the transit track 44 preparatory to being moved toward the cubicles 16 within which the workpiece is to be stored.

Assuming now that the carrier members 446 and associated workpiece suspended therefrom are supported on the transit track 44, the drive motor 92 of the crane carriage assembly 40 is actuated so as to move the entire stacker crane assembly 34 longitudinally of the transfer aisle 14 to some preselected position wherein the assembly 34 is in front of the particular tier of cubicles 16 including the cubicle 16 within which the workpiece is to be stored. As the crane assembly 34 is thus moved longitudinally of the aisle 14, the drive motor 232 is energized, whereby to effect rotational movement of the ring gear 216, with the result that the entire transfer mechanism 46 and transit track 44 are rotated approximately 90° to a position wherein the transit track 44 extends perpendicular to the length of the aisle 14 preparatory to the workpiece and associated carrier members 446 being transferred from the hoist assembly 42 onto the support track 36 of one of the cubicles 16. After the stacker crane assembly 34 is properly positioned in front of some predetermined tier of cubicles 16, the drive motor 158 is energized, whereby to pump hydraulic actuating fluid to the motors 138, 140 that effect rotational movement of the drums 130, 132. As previously described, rotational movement of the drums 130, 132 effects winding or unwinding of the cables 126, 128, whereby the entire hoist assembly 42 is raised or lowered along the support column 38 until the transit track 44 is substantially aligned with the support track 36 of the cubicle 16 within which the workpiece is to be stored.

After the hoist assembly 42 has been properly positioned along the support column 38, one of the piston and cylinder assemblies 193 or 194 is actuated in a manner so as to effect lateral movement of the shuttle frame 170 toward the row of cubicles 16 within which the workpiece is to be stored. Such lateral movement of the shuttle frame 170 results in the entire transfer mechanism 46 and transit track 44 being moved toward the support track 36 in the cubicle 16 which is to receive the workpiece. It will be apparent, of course, that which of the piston and cylinder assemblies 193 or 194 is to be actuated will depend upon which side of the aisle 14 the workpiece is to be stored. Preparatory to actuation of the piston and cylinder assemblies 193 or 194 and subsequent lateral movement of the shuttle frame 170 and track 44 supported thereon, one of the piston and cylinder assemblies 422 or 424 is actuated to extend one of the locating pins 410 or 412 so that when the shuttle frame 170 is properly positioned, the laterally outer end of the appropriate locating pin 410, 412 is received within the associated collar 426 to assure that the transit track 44 is accurately aligned with the support track 36 onto which the workpiece is to be transferred.

At such time as the transit track 44 is properly aligned with the support track 36 of the cubicle 16 into which the workpiece is to be transferred, the piston and cylinder assembly 320 is energized in a manner so as to effect extension of the transfer carriage 288 from the position shown in diagram E of FIG. 13 to the position shown in diagram D of this Figure, with the result that the dogs 354, 356 will bias the carrier members 446 and associated workpiece supported on the transit track 44 partially onto the support track 36 of the cubicle 16. Thereafter, the drive motor 344 is energized to rotate the drive chain 340 and dogs 354, 356 from the position shown in diagram D in FIG. 13 to the position shown in diagram C of this Figure, with the result that the dogs 354, 356 will bias the carrier members 446 entirely onto the support track 36 in the cubicles 16. It will be noted that when the dogs 354, 356 are disposed in the position shown in diagram C of FIG. 13, retraction of the carriage 288 may be effected without any interference of the dogs 354, 356 with the carrier members 446; thus, when the transfer carriage 288 is retracted from the position shown in diagram C to the position shown in diagram B, the carrier members 446 and workpiece are left supported upon the track 36 in the cubicle, after which time the drive motor 344 may be actuated to rotate the drive chain 340 and dogs 354, 356 to the position shown in diagram A of FIG. 13. Thereafter, the extended locating pin 410 or 412 may be retracted and the shuttle frame 170 centered or biased to its neutral position equidistant from the cubicle rows 12, whereby the stacker crane assembly 34 is prepared to move longitudinally of the aisle 14 to pick up the next successive workpiece or container of workpieces to be stored in the cubicles 16.

At such time as it is desired to transfer one or more workpieces from one of the cubicles 16 to one of the feeder track sections 32 of the outbound conveyor track 28, the above procedural steps are followed almost exactly, only in reverse order; that is, the stacker crane assembly 34 is moved longitudinally of the associated aisle 14 until the hoist assembly 42 is in front of the tier of cubicles 16 in which the workpiece is stored. Thereafter, the hoist assembly 42 is raised or lowered along the support column 38 until the transit track 44 is vertically aligned with the support track 36 in the cubicle 16. The shuttle mechanism 50 is then actuated so as to juxtaposition the transit track 44 with the support track 36 and one of the locating pins 410 or 412 is extended to assure proper alignment between the tracks 44 and 36. The dogs 354, 356 are then rotated from the position shown in diagram A of FIG. 13 to the position shown in diagram B, and thereafter, the transfer carriage 288 is extended to the position shown in diagram C. The dogs 354, 356 are then rotated to the position shown in diagram D, whereby said dogs 354, 356 engage the carrier members 446 supporting the workpiece within the cubicle 16 and effect partial lateral outward movement of the carrier members 446 toward the transit track 44. The transfer carriage 228 is then retracted to the position shown in diagram E in FIG. 13. whereby the carrier members 446 and workpiece supported thereby are transferred completely onto the transit track 44. The shuttle mechanism 50 is then neutralized and the associated locating pin is retracted, after which time the rotary positioning mechanism is actuated so as to rotate the transit track 44 and transfer mechanism 46 approximately 90° so that they extend longitudinally of the aisles 14. The entire stacker crane assembly 34 is then moved longitudinally of the aisle 14 toward the track section 32 and the workpiece and associated carrier members 446 are transferred thereto in substantially the same manner as they were transferred from the hoist assembly 42 onto the support track 36 of the cubicles 16. It will be apparent, of course, that the transfer carriage member 288 is adapted to move toward the left in the diagrams in FIG. 13, as well as toward the right as is shown in this Figure, at such times as workpieces are to be transferred to and from the cubicles 16 along the opposite side of one of the aisles 14, and that the dogs 354, 356 are rotatable in order to effect the desired transfer of carrier members to and from the transit track 44 when said carriage 288 is extended toward the left in these diagrams.

It will be noted that various types of control systems may be incorporated in the stacker storage system of the present invention as, for example, a control system including position responsive limit switches or the like which may be used to effect the desired actuation of the various drive motors of each of the stacker crane assemblies 34. A particularly important feature of the present invention resides in the fact that the entire system may be entirely automated commensurate with well known electronic computer techniques, whereby the various workpieces may be transferred to and from the cubicles 16 and conveyor tracks 22 and 28 entirely automatically, thereby minimizing to the extreme, if not completely obviating the need for any manual attention.

It will be appreciated that the present invention is not necessarily limited to a system wherein the stacker crane assembly 34 must rotate the work carriers and associated workpieces in order to properly align the same with the storage track sections 36 and the respective spur track sections from which and onto which the work carriers are transferred. More particularly, it is contemplated that the present invention will find widely accepted use in installations wherein the transit or transfer track 44 is relatively fixed upon the crane assembly 34 at a position wherein the transit track 44 is arranged at generally right angles to the longitudinal aisles 14 between the rows 12 of storage cubicles 16. In other words, the transit track 44 would remain in a position generally parallel to the storage or support track sections 36 in the cubicle 16 and would merely move longitudinally and vertically along the aisles 14 to selected positions aligned with the track sections 36 for purposes of having a work carrier transferred therebetween. In such an application, the portions of the spur track sections at the transfer points, i.e., the points at which work carriers are transferred between the spur track sections and transfer track section 44, would be oriented generally parallel to the storage track sections; in other words, at right angles to the aisle 14. Accordingly, the work carriers could be transferred directly from a feeder spur track onto the transfer track 44, after which time the crane assembly could move longitudinally and vertically of the appropriate row of cubicles to a position wherein the transfer track is aligned with a selected storage track, and the carrier could thereafter be transferred onto the storage track. This entire operation can be performed without requiring rotation of the transfer track in view of the fact that at the transfer point between the spur track and transfer track, both the spur track and the transfer track are parallel to the storage track sections. The same would be true of the portion of the outbound spur track at the transfer point between the spur track and the transfer track. By way of example, three typical installations of the aforedescribed type of system are schematically depicted in FIGS. 14–16, which systems will hereafter be described in detail with the component parts thereof analogous to the similar parts of the system 10 being designated by like numerals with prime suffixes.

Figure 14:
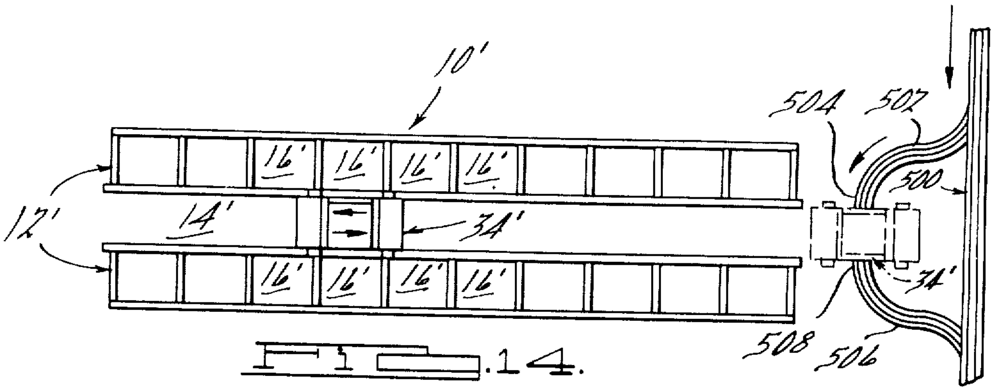
FIGS. 14-16 are schematic representations of alternate stacker storage systems embodying the principles of the present invention.

With reference to FIG. 14, a storage system 10′ is shown as comprising at least two rows 12′ of workpiece storage cubicles 16′ arranged on the opposite sides of a workpiece transfer aisle 14′. The system 10′ is shown in operative association with a main conveyor track 500 which is analogous to the aforedescribed track 24 and which is provided with a spur track section 502 having a discharge point 504. In addition, the main conveyor track 500 includes another spur track section 506 having a workpiece pick-up point 508. The portions of the track sections 502, 506 at which the discharge and pick-up points 504, 508 are located are disposed on the opposite sides of the line of travel, i.e., aisle 14′, along which a stacker crane assembly 34′ is adapted to travel. In addition, the portions of the track sections 502, 506 at the locations 504, 508 are arranged generally parallel to the storage track sections in the cubicles 16′. The spacing between the locations 504, 508 is such that the crane assembly 34′ may move longitudinally along the aisle 14′ to a position therebetween and thus may function to receive work carriers from the spur track section 502 or alternatively, transfer work carriers onto the spur track section 506, or vice versa. Accordingly, work carriers may be conveyed along the main conveyor track 500 and may be selectively transferred to the spur track section 502 where the carriers will move to the discharge or transfer point 504. The crane assembly 34′ may be moved longitudinally of the aisle 14′ to a position wherein the transit or transfer track 44′ thereof is in generally end-to-end abutting relation with the spur track section 502 at the discharge point 504.

The crane assembly 34′ may then be actuated to effect the transfer of a work carrier and associated workpiece from the spur track section 502 onto the transfer track section of the assembly 34′. Thereafter, the assembly 34′ may be moved longitudinally and vertically of the aisle 14′ to a position in confronting relation with a particular storage cubicle 16′, whereupon the work carrier and workpiece may be transferred onto the associated storage track section therein, as hereinbefore described. Similarly, at such time as it is desired to transfer a work carrier and workpiece from one of the cubicles 16′, the same may be transferred from the cubicle 16′ on the transfer track of the crane assembly 34′ in the manner described above, after which time the crane assembly 34′ may move longitudinally of the aisle 14′ to a position wherein the transfer track thereof is in end-to-end abutting relation with the spur track section 506. Thereafter, the work carrier and workpiece may be transferred onto the spur track section 506 at the pick-up point 508 thereof, whereupon the work carrier and workpiece may be conveyed along the spur track section 506 back to the conveyor track 500 or other suitable conveyor in the system.

Figure 15:
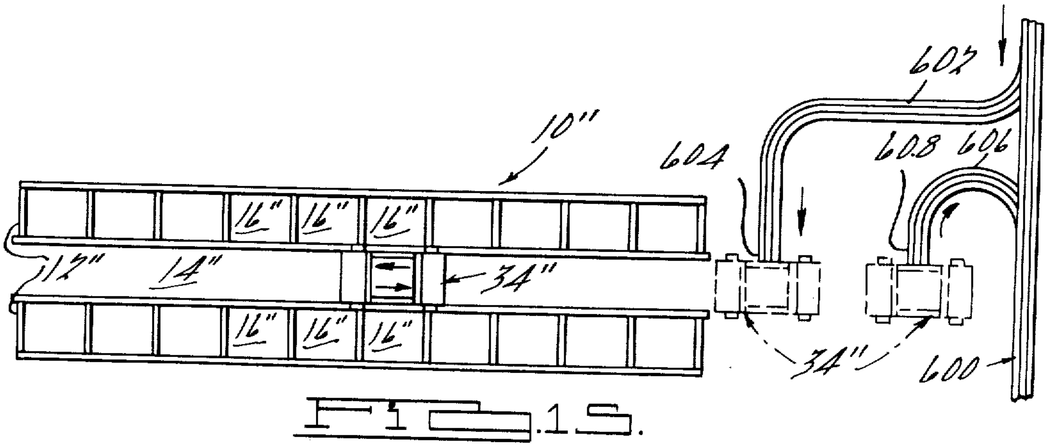
Figure 16:
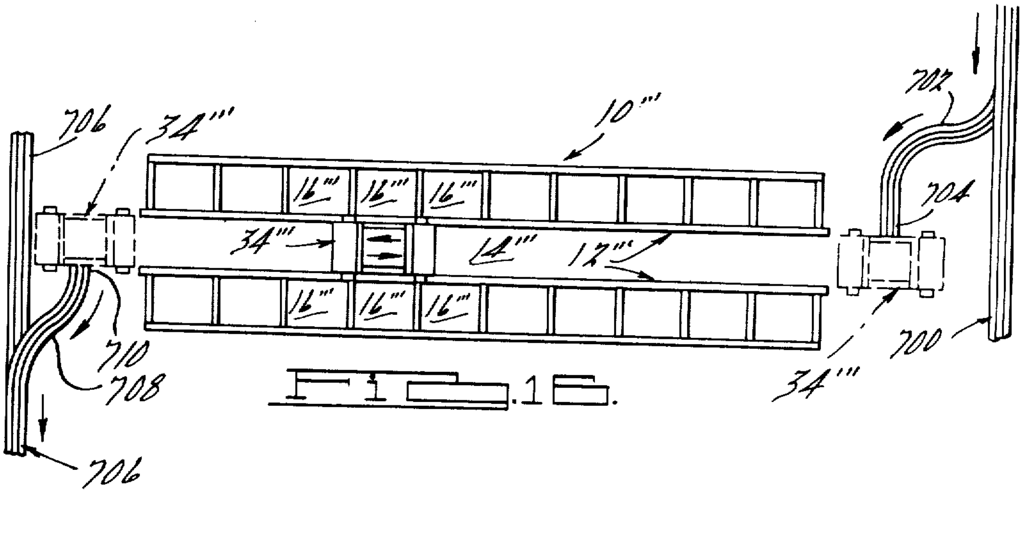

FIG. 15 illustrates a storage system 10″ and includes rows 12″ of cubicles 16″ located on the opposite sides of a longitudinal aisle 14″ along which a crane assembly 34″ is movable. The system 10″ is shown in operative association with a main conveyor 600 having a spur track section 602 defining a discharge point 604. In addition, the conveyor 600 includes a spur track section 606 having a pick-up point 608. As illustrated, the discharge and pick-up points 604, 608, respectively, are generally longitudinally aligned with the aisle 14″ at the same end thereof and the portions of the spur track sections 602, 606 at the points 604, 608 are arranged parallel to the storage track sections in the cubicles 16″, in other words, at generally right angles to the aisle 14″ and generally parallel to the direction of movement of the work carriers along the main conveyor 600. The system 10″ is intended to operate in the same manner as the system 10′ in permitting work carriers to be picked up at the discharge point 604 and be transferred longitudinally of the aisle 14″ for storage in a selected cubicle 16″ without requiring rotation of the transfer track on the assembly 34″. Additionally, the work carriers and associated workpieces may be transferred via the crane assembly 34″ longitudinally of the aisle 14″ to a position wherein the transfer track is in generally end-to-end abutting relation with the spur track section 606 at the pick-up point 608, whereby the work carriers may be transferred onto the spur track section 606 and returned to the main conveyor 600 or other conveyor in the associated system, as will be appreciated by those skilled in the art. As will be apparent, the essential difference between the systems 10′ and 10″ is that the discharge and pick-up points 604, 608 of the spur track sections 602, 606 are on the same side of the aisle 14″ in the system 10″, as opposed to being on the opposite sides of the aisle 14′ in the system 10′. Accordingly, assuming that the respective transfer tracks are not rotatable, in the system 10″ work carriers are transferred onto and off from the same end of the transfer track of the crane assembly 34″, whereas in the system 10′, work carriers move onto one end of the transfer track from the spur track section 502 and are transferred off from the opposite end of the transfer track onto the spur track section 508. Of course, this would not necessarily be the case if the transfer track were rotatable, as described in connection with the earlier described crane assembly 34.

FIG. 16 illustrates still another storage system 10''' which is similar to the systems 10' and 10'' and includes at least two rows 12''' of cubicles 16''' arranged along the opposite sides of a longitudinal aisle 14''' along which a crane assembly 34''' is longitudinally movable. The system 10''' is shown in operative association with a main conveyor 700 having a spur track section 702 having a discharge end 704. The system 10''' also is associated with a conveyor 706 having a spur track section 708 defining a pick-up point 710 and located at the opposite end of the aisle 14''' from the spur track section 702. It will be appreciated that the conveyors 700 and 706 may be the same conveyor or different conveyors depending upon the particular installation of the system 10''' and the ancillary manufacturing and/or storage procedures which workpieces being conveyed throughout the system are to be subjected to. As illustrated in FIG. 16, the discharge and pick-up points 704, 710 are generally longitudinally aligned with the aisle 14''' at the opposite ends thereof and are oriented with respect to the longitudinal direction of movement of the transfer track on the crane assembly 34''' such that when the assembly 34' is in confronting relation with the spur track section 702 workpieces can be transferred in the manner hereinabove described from the spur track section 702 onto the transfer track section of the assembly 34'''. In a like manner, the spur track section 708 is oriented such that when the assembly 34''' moves longitudinally to the opposite end of the aisle 14''', work carriers and associated workpieces may be transferred in the manner hereinabove described from the transfer track of the assembly 34''' onto the spur track section 708 whereupon the work carriers and associated workpieces may be conveyed via the conveyor 706 to some predetermined destination.

It will be noted that the various storage systems 10', 10'' and 10''' are particularly, although not necessarily, adapted for operative association with power-and-free conveyor systems in the same manner as the abovedescribed storage system 10, and accordingly, the various conveyors 500, 600, 700 and 706 are preferably, although not necessarily, of the power-and-free type.

While it will be apparent that the embodiments illustrated herein are well calculated to fulfill the objects above stated, it will be appreciated that the present invention is susceptible to modification, variation and change without departing from the proper scope or fair meaning of the subjoined claims.

I claim:

1. In a plant work transport and storage system having a main conveyor system on which work carriers travel in the system, a work storage area disposed adjacent said conveyor system, a first spur track section extending from said conveyor system to a first work transfer point adjacent to said work storage area and adapted to transport work carriers from said conveyor system to said work storage area, a second spur track section extending from said conveyor system to a second work transfer point adjacent to the work storage area adapted to transport work carriers from the work storage area to said conveyor system, said work storage area having at least one bank of vertically and horizontally spaced work storage compartments arranged along a longitudinal aisle and each compartment provided with an overhead storage track section, a stacker crane assembly movable horizontally alongside said bank of work storage compartments between individual work storage compartments and to and from said first and second work transfer points and provided with a transfer track section, said stacker crane assembly including elevating means for moving said transfer track section vertically of said work storage compartments and between individual compartments, means mounted on said elevating means for selectively positioning said transfer track section in aligned, substantially butting end-to-end relation with a selected spur track section and selectively individually with said storage track sections when said elevating means is at selected vertical and horizontal positions relative to said storage area, and means for moving work carriers onto and off of said transfer track section at said transfer points and at said storage compartments, said main conveyor system, said first and second spur track sections, said storage track sections, and said transfer track section being essentially similar to each other and adapted to receive and to accommodate interchangeably work carriers in said system, said work carriers being movable from said conveyor system to said first spur track section, then shiftable to the transfer track section of said stacker crane assembly at said first work transfer point, then movable on the transfer track section by said stacker crane assembly to a selected work storage compartment and shifted for storage onto the storage track section of the selected compartment, said stored work carriers being individually selectively retrievable from said work storage compartments by shifting the selected work carrier from the storage track in the compartment in which it is stored to the transfer track section of said stacker crane assembly, moved by the latter to said second work transfer point, and then shifted onto said second spur track section and thereafter to said conveyor system.

2. The invention as set forth in claim 1 wherein said work storage area comprises a plurality of rows and tiers of work storage compartments defining an aisle therebetween, and wherein said stracker crane assembly is movable longitudinally of said aisle and adapted to transfer work carriers and associated work between said storage area and said first and second spur track sections.

3. The invention as set forth in claim 2 wherein said transfer track is movable laterally of said aisle in order to have work carriers transferred between said transfer track and storage compartments on either side of said aisle.

4. The invention as set forth in claim 1 which includes means for selectively moving said transfer track relative to said elevating means toward and away from said spur track sections and said storage track sections for transferring work carriers therebetween.

5. The invention as set forth in claim 1 which includes positioning means for selectively longitudinally positioning said transfer track section with said storage track sections upon movement of said transfer track section toward said storage track sections.

6. The invention as set forth in claim 5 wherein said positioning means includes cooperable engageable means on said stacker crane assembly and said storage area, said positioning means being extendable and retractable to position said transfer track section with selected of said storage track sections preparatory to work carriers and associated workpieces being transferred therebetween.

7. The invention as set forth in claim 1 which includes means in each of said storage compartments for retaining work carriers and associated workpieces upon the associated of said storage track sections, whereby to prevent inadvertent movement of a work carrier and associated workpiece off from the support track section upon which they are being stored.

8. The invention as set forth in claim 7 wherein said work carrier retaining means includes hold-back latch means responsive to predetermined operation of said stacker crane assembly to permit removal of work carriers from the associated of said storage track sections upon which the carrier is supported.

9. The invention as set forth in claim 8 which includes means for longitudinally positioning said transfer track section with said storage track sections, said positioning means being cooperable with said hold-back latch means to effect release of work carriers and associated workpieces from said storage track sections to permit the same to be transferred between said storage track sections and said transfer track section.

10. The invention as set forth in claim 1 wherein said conveyor system is a power-and-free conveyor system.

11. The invention as set forth in claim 1 wherein said transfer track section is selectively movably mounted on said stacker crane assembly so as to permit a relative limited movement of said transfer track section so that the same may be moved into aligned butting end-to-end relation with said spur track sections and said storage track sections.

12. The invention as set forth in claim 1 which includes first and second mechanically engageable means on said stacker crane assembly and on each of said storage compartments cooperable to longitudinally align said transfer track section with said storage track sections, and which includes means for longitudinally moving said transfer track section toward and away from abutting relation with said storage track sections, said first and second engageable means being moved toward and away from operative relation with one another upon preselected longitudinal movement of said transfer track section.

13. The invention as set forth in claim 12 which includes means responsive to operation of said engageable means for releasably maintaining work carriers and associated workpieces on said storage track sections.

14. The invention as set forth in claim 1 wherein said conveyor system includes horizontally spaced delivery and pick-up conveyor tracks, and wherein said first spur track section is adapted to transfer work carriers from said delivery track and wherein said second spur track section is adapted to deliver work carriers to said pick-up conveyor track.

15. The invention as set forth in claim 1 wherein at least a portion of said first spur track section at said first work transfer point is oriented generally parallel to said storage track sections, whereby work carriers may be transferred from said first spur track section to said storage track sections without having to be turned or rotated upon said stacker crane assembly.

16. The invention as set forth in claim 1 wherein the portion of said first spur track section at said first work transfer point is arranged at generally right angles to said aisle, whereby work carriers may be transferred from said first spur track section to said storage track sections without having to be turned or rotated upon said stacker crane assembly.

17. The invention as set forth in claim 1 wherein a portion of said first spur track section at said first work transfer point is arranged generally parallel to the direction of movement of work carriers along said main conveyor system, whereby work carriers may be transferred from said first spur track section to said storage track sections without having to be turned or rotated upon said stacker crane assembly.

18. The invention as set forth in claim 1 wherein said first and second work transfer points are generally coincident, whereby when said stacker crane assembly is positioned at said transfer points, work carriers may be transferred onto one end of said transfer track section from said first spur track section and off from the opposite end of said transfer track section onto said second spur track section.

19. The invention as set forth in claim 1 wherein the portion of said first spur track section at said first work transfer point is arranged generally parallel to said storage track sections and at right angles to said aisle and generally parallel to the direction of movement of carriers moving along said conveyor system prior to the carrier's moving onto said first spur track section from said conveyor system.

20. The invention as set forth in claim 19 wherein said first and second transfer points are generally longitudinally aligned with said aisle and with one another.

21. The invention as set forth in claim 20 wherein said first and second transfer points are located at the same end of said aisle.

22. The invention as set forth in claim 20 wherein said first and second transfer points are located at the opposite ends of said aisle.

23. The invention as set forth in claim 15 wherein a portion of said second spur track section at said second work transfer point is arranged generally parallel to said storage track sections, whereby work carriers may be transferred from said storage track sections via said transfer track section to said second spur track section without having to be turned or rotated on said stacker crane assembly.

24. The invention as set forth in claim 16 wherein said second spur track section at said second transfer point is arranged at generally right angles to said aisle, whereby work carriers may be transferred from said storage track sections via said transfer track section to said second spur track section without having to be turned or rotated on said stacker crane assembly.

25. The invention as set forth in claim 17 wherein said second spur track section at said second transfer point is arranged generally parallel to the direction of movement of work carriers along said main conveyor system, whereby work carriers may be transferred from said storage track sections via said transfer track section to said second spur track section without having to be turned or rotated on said stacker crane assembly.

26. The invention as set forth in claim 23 wherein said first and second transfer points are located at the same end of said aisle and are generally longitudinally aligned therewith.

27. The invention as set forth in claim 23 wherein said first and second transfer points are arranged at the opposite ends of said aisle and are generally longitudinally aligned therewith.

28. The invention as set forth in claim 14 wherein said first and second spur track sections are generally longitudinally aligned with said aisle at said first and second transfer points.

29. In a plant work transport and storage system including a main power-and-free conveyor system on which work carriers travel throughout the system, a work storage area located adjacent the conveyor system, a first spur track section extending from the conveyor system to a first work transfer point adjacent the work storage area and adapted to transport work carriers from the conveyor system to the work storage area, a second spur track section extending from a second work transfer point adjacent the work storage area to and connecting with the conveyor system and adapted to transport work carriers from the work storage area to the conveyor system, at least one bank of vertically and horizontally spaced work storage compartments arranged adjacent a longitudinal aisle, and at least one stacker crane movable along said aisle for moving work carriers between the power-and-free conveyor system and said work storage area, each of said work storage compartments being provided with a storage track section and each storage track section having one end thereof confronting said aisle, said stacker crane being movable between individual work storage compartments and said first and second work transfer points and provided with a transfer track section, said stacker crane assembly including elevating means for moving said transfer track section vertically of said work storage compartments and between individual compartments, means mounted on said elevating means for selectively positioning said transfer track section in aligned, substantially butting end-to-end relation with a selected spur track section and selectively individually with said storage track sections when said elevating means is at selected vertical and horizontal positions relative to said storage area, and means for moving work carriers onto and off of said transfer track section at said transfer points and at said storage compartments, said power-and-free conveyor system, said first and second spur track sections, said storage track sections, and said transfer track section being essentially similar to each other and adapted to receive and accommodate interchangeable work carriers, said work carriers being movable off from said conveyor system to said first spur track section, then shiftable to the transfer track section of said stacker crane at said first work transfer point, then movable on the transfer track section by said stacker crane to a selected work storage compartment and shifted for storage onto the storage track section of the selected compartment, said stored work carriers being individually selectively retrievable from said work storage compartments by shifting the selected work carrier from the storage track in the compartment in which it is stored to the transfer track section of said stacker crane, moved by the latter to said second work transfer point, and then shifted onto said second spur track section and thereafter to said power-and-free conveyor system.

30. The invention as set forth in claim 29 wherein said work storage area comprises at least two rows and tiers of work storage compartments defining an aisle therebetween, and wherein said stacker crane asembly is movable longitudinally of said aisle and adapted to transfer work carriers and associated work between said storage area and said conveyor system.

31. The invention as set forth in claim 30 wherein said transfer track is movable laterally of said aisle in order to have work carriers transferred between said transfer track and storage compartments on either side of said aisle.

32. The invention as set forth in claim 29 which includes means for selectively moving said transfer track relative to said elevating means toward and away from said spur track sections and said storage track sections for transferring work carriers therebetween.

33. The invention as set forth in claim 29 which includes positioning means for selectively longitudinally positioning said transfer track section with said storage track sections upon movement of said transfer track section toward said storage track sections.

34. The invention as set forth in claim 33 wherein said positioning means includes cooperable engageable means on said stacker crane assembly and said storage area, said positioning means being extendable and retractable to position said transfer track section with selected of said storage track sections preparatory to work carriers and associated workpieces being transferred therebetween.

35. The invention as set forth in claim 29 which includes means in each of said storage compartments for retaining work carriers and associated workpieces upon the associated of said storage track sections, whereby to prevent inadvertent movement of a work carrier and associated workpiece off from the support track section upon which they are being stored.

36. The invention as set forth in claim 35 wherein said work carrier retaining means includes hold-back latch means responsive to predetermined operation of said stacker crane assembly to permit removal of work carriers from the associated of said storage track sections upon which the carrier is supported.

37. The invention as set forth in claim 29 wherein said transfer track section is selectively movably mounted on said stacker crane assembly so as to permit a relatively limited movement of said transfer track section so that the same may be moved into aligned butting end-to-end relation with said spur track sections and said storage track sections.

38. The invention as set forth in claim 29 which includes first and second mechanically engageable means on said stacker crane assembly and on each of said storage compartments cooperable to longitudinally align said transfer track section with said storage track sections, and which includes means for longitudinally moving said transfer track section toward and away from abutting relation with said storage track sections, said first and second engageable means being moved toward and away from operative relation with one another upon preselected longitudinal movement of said transfer track section.

39. The invention as set forth in claim 38 which includes means responsive to operation of said engageable means for releasably maintaining work carriers and associated workpieces on said storage track sections.

40. The invention as set forth in claim 29 wherein said conveyor system includes horizontally spaced delivery and pick-up conveyor tracks, and wherein said first spur track section is adapted to transfer work carriers from said delivery track and wherein said second spur track section is adapted to deliver work carriers to said pick-up conveyor track.

41. The invention as set forth in claim 29 wherein at least a portion of said first spur track section at said first work transfer point is oriented generally parallel to said storage track sections, whereby work carriers may be transferred from said first spur track section to said storage track sections without having to be turned or rotated upon said stacker crane assembly.

42. The invention as set forth in claim 29 wherein the portion of said first spur track section at said first work transfer point is arranged at generally right angles to said aisle, whereby work carriers may be transferred from said first spur track section to said storage track sections without having to be turned or rotated upon said stacker crane assembly.

43. The invention as set forth in claim 29 wherein a portion of said first spur track section at said first work transfer point is arranged generally parallel to the direction of movement of work carriers along said main conveyor system, whereby work carriers may be transferred from said first spur track section to said storage track sections without having to be turned or rotated upon said stacker crane assembly.

44. The invention as set forth in claim 29 wherein said first and second work transfer points are generally coincident, whereby when said stacker crane assembly is positioned at said transfer points, work carriers may be transferred onto one end of said transfer track section from said first spur track section and off from the opposite end of said transfer track section onto said second spur track section.

45. The invention as set forth in claim 29 wherein the portion of said first spur track section at said first work transfer point is arranged generally parallel to said storage track sections and at right angles to said aisle and generally parallel to the direction of movement of carriers moving along said conveyor system prior to the carrier's moving onto said first spur track section from said conveyor system.

46. The invention as set forth in claim 44 wherein said first and second transfer points are generally longitudinally aligned with said aisle and with one another.

47. The invention as set forth in claim 45 wherein said first and second transfer points are located at the same end of said aisle.

48. The invention as set forth in claim 45 wherein said first and second transfer points are located at the opposite ends of said aisle.

49. The invention as set forth in claim 44 wherein a portion of said second spur track section at said second work transfer point is arranged generally parallel to said storage track sections, whereby work carriers may be transferred from said storage track sections via said transfer track section to said second spur track section without having to be turned or rotated on said stacker crane assembly.

50. The invention as set forth in claim 44 wherein said second spur track section at said second transfer point is arranged at generally right angles to said aisle, whereby work carriers may be transferred from said storage track sections via said transfer track section to said second spur track section without having to be turned or rotated on said stacker crane assembly.

51. The invention as set forth in claim 44 wherein said second spur track section at said second transfer point is arranged generally parallel to the direction of movement of work carriers along said main conveyor system, whereby work carriers may be transferred from said storage tracks sections via said transfer track section to said second spur track section without having to be turned or rotated on said stacker crane assembly.

52. The invention as set forth in claim 48 wherein said first and second transfer points are located at the same end of said aisle and are generally longitudinally aligned therewith.

53. The invention as set forth in claim 48 wherein said first and second transfer points are arranged at the opposite ends of said aisle and are generally longitudinally aligned therewith.

54. The invention as set forth in claim 39 wherein said first and second spur track sections are generally longitudinally aligned with said aisle at said first and second transfer points.

* * * * *